United States Patent [19]

Negishi et al.

[11] Patent Number: 5,669,016
[45] Date of Patent: Sep. 16, 1997

[54] LENS-FITTED PHOTO FILM UNIT AND METHOD OF PRODUCING THE SAME

[75] Inventors: Kenji Negishi; Osamu Noguchi; Shinsuke Aoshima; Kazuo Kamata, all of Kanagawa, Japan

[73] Assignee: Fuji Photo Film Co., Ltd., Kanagawa, Japan

[21] Appl. No.: 645,214

[22] Filed: May 13, 1996

[30] Foreign Application Priority Data

May 15, 1995 [JP] Japan .................... 7-116018
Apr. 19, 1996 [JP] Japan .................... 8-098716

[51] Int. Cl.$^6$ .................................. G03B 17/02
[52] U.S. Cl. ........................................... 396/6
[58] Field of Search ........................ 354/275, 277, 354/288; 396/6

[56] References Cited

U.S. PATENT DOCUMENTS

| | | | |
|---|---|---|---|
| 5,231,438 | 7/1993 | Smart | 354/281 |
| 5,319,406 | 6/1994 | Takatori . | |
| 5,357,303 | 10/1994 | Wirt . | |
| 5,384,613 | 1/1995 | Cloutier et al. | 354/275 |
| 5,452,036 | 9/1995 | Kamata . | |
| 5,495,310 | 2/1996 | Takatori | 354/288 |
| 5,500,705 | 3/1996 | Stephenson, III | 354/288 |
| 5,517,270 | 5/1996 | Balling | 354/288 |
| 5,550,608 | 8/1996 | Smart et al. | 354/174 |

FOREIGN PATENT DOCUMENTS 43 43 043 A1  6/1994  Germany .

Primary Examiner—M. L. Gellner
Assistant Examiner—Daniel Chapik
Attorney, Agent, or Firm—Young & Thompson

[57] ABSTRACT

A lens-fitted photo film unit has a housing (2), in which a photo film roll chamber and a cassette containing chamber (8, 70) are formed. A cassette incorporates a port shutter (14) rotatable between a closed position of closing a photo film passage port and an open position of opening the passage port. The photo film is wound into the cassette as much as one frame each time one frame is exposed. The cassette is removed from the cassette containing chamber after winding the photo film entirely into the cassette. Through an exit opening, the cassette containing chamber is open externally. An openable bottom lid (7, 66, 75, 80) closes the exit opening, is opened for the removal of the cassette. A rotating mechanism (30, 76, 87, 93; 34, 78, 88, 90; 35, 50, 60, 72, 85) is engaged with the port shutter through a top wall (8a, 70a) of the cassette containing chamber, rotates the port shutter from the open position to the closed position in response to operation opening the bottom lid.

36 Claims, 23 Drawing Sheets

F I G. 15
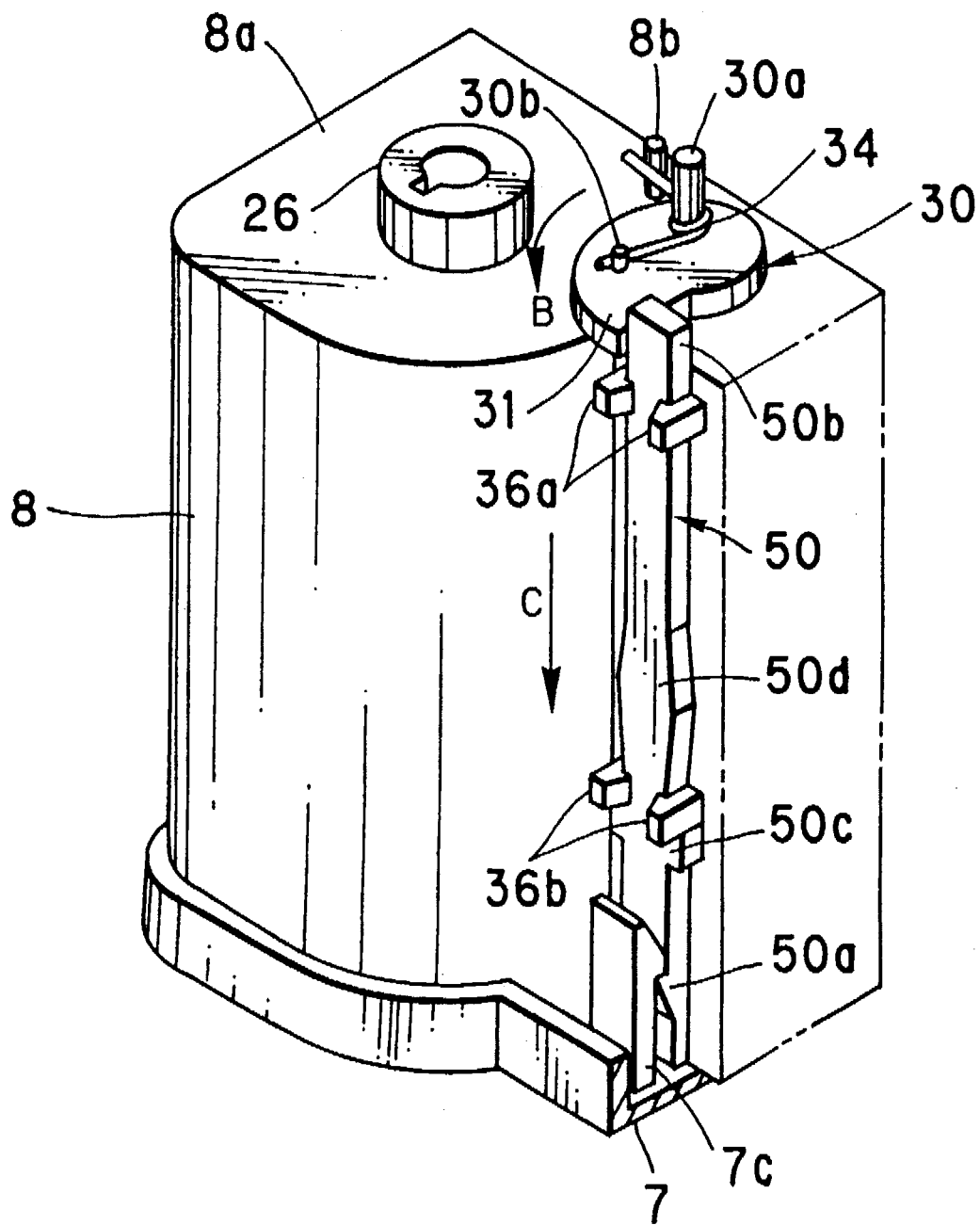

F I G. 22
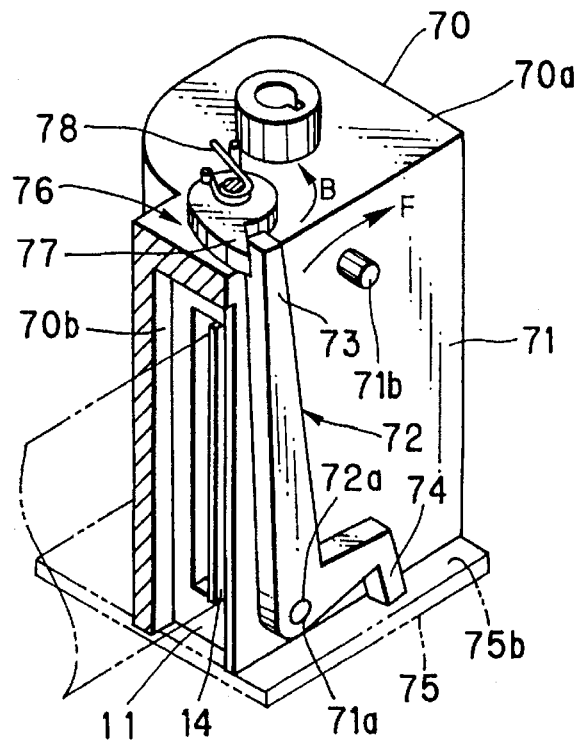
F I G. 23
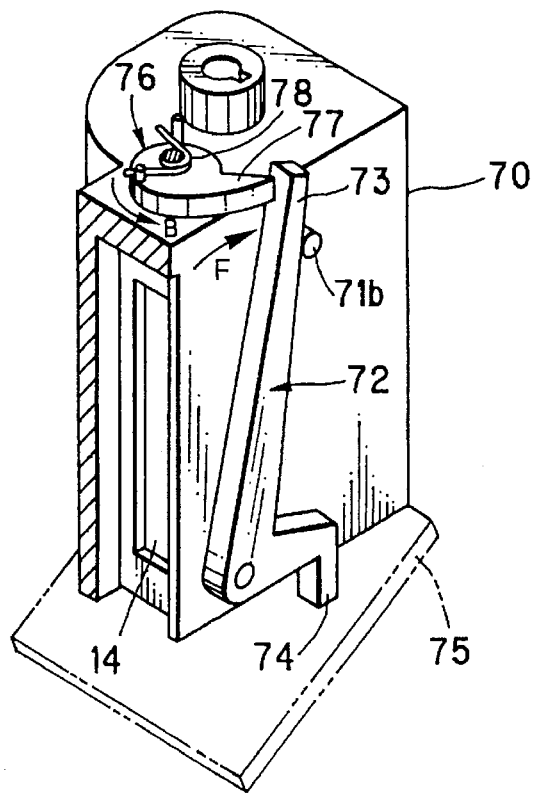

F I G. 24
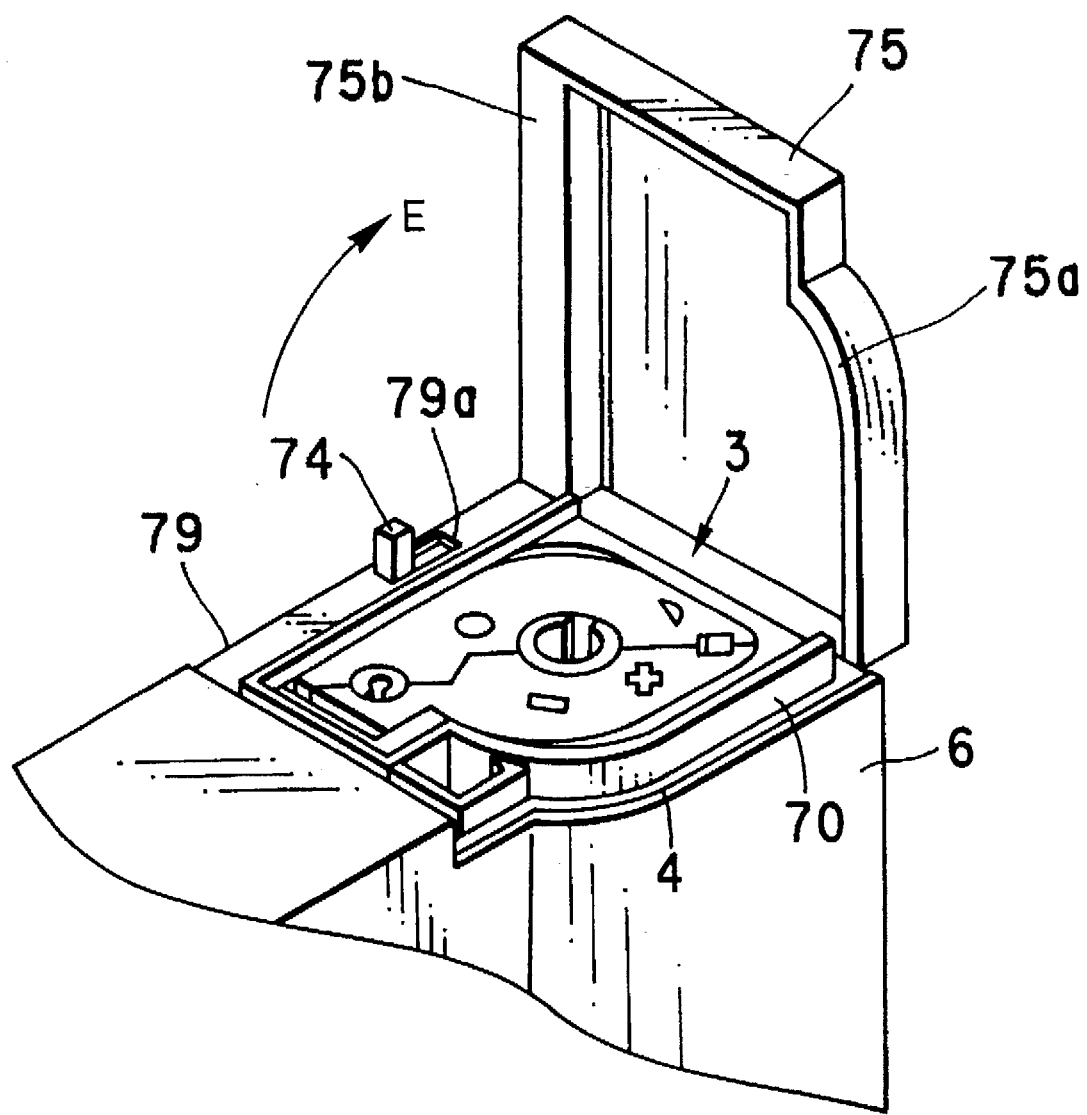

LENS-FITTED PHOTO FILM UNIT AND METHOD OF PRODUCING THE SAME

BACKGROUND OF THE INVENTION

1. Field of the Invention

The present invention relates to a lens-fitted photo film unit and a method of producing the same. More particularly, the present invention relates to a lens-fitted photo film unit within which a photo film port shutter is incorporated in a cassette and used for opening/closing a photo film passage port, and a method of producing the same lens-fitted photo film unit.

2. Description Related to the Prior Art

A lens-fitted photo film unit is sold by the assignee with a trade name Fujicolor Quick Snap Super 800 (manufactured by Fuji Photo Film Co., Ltd.), which has a housing incorporating a taking lens, a shutter mechanism and other structures for taking an exposure, and is pre-loaded with a cassette and unexposed photo film pre-drawn from the cassette. The housing and the component parts of the lens-fitted photo film unit are respectively formed from resin to reduce their cost, because of manufacture in great scale and sales at a low price. There are a number of suggestions of pre-loading a lens-fitted photo film unit with a photo film cassette having a plastic body.

There is a known new type of plastic cassette in which a photo film passage port has a photo film port shutter, not a light-shielding fabric widely used in the art of photo film cassette. The port shutter is rotatable between an open position where the passage port is open and a closed position where the passage port is closed. The closed position of the port shutter avoids entry of ambient light into the cassette through the passage port. The photo film contained therein is protected from exposure before taking photographs or before development. There is a suggestion in U.S. Pat. No. 5,452,036 for a lens-fitted photo film unit pre-loaded with this type of the cassette.

In the lens-fitted photo film unit pre-loaded with the cassette and the photo film, all the photo film is wound into the cassette after taking exposures thereon. The lens-fitted photo film unit is deposited to a photo laboratory or a photofinishing agent, who removes the cassette from a housing of the lens-fitted photo film unit, to develop the photo film. The cassette can be removed only when the port shutter is rotated to the closed position. In any photo laboratory, the cassette is removed in an illuminated room, not in a dark room. Unless the port shutter is closed, the photo film would be subjected to ambient light in the course of the removal.

It is possible to conceive a lens-fitted photo film unit including a rotating member, which is engaged with a distal end of the port shutter of the cassette in co-axial fashion, and externally operated to rotate the port shutter to the closed position. However this structure is likely to lower efficiency in removing the cassette from the lens-fitted photo film unit, because the removal requires a specialized tool and/or operation of externally driving the rotating member.

Operators in photo laboratories are obliged to handle lens-fitted photo film units of a type having a 135 photo film cassette in addition to the new type having the cassette with the port shutter. Prior to removal of the cassette from the new type, the rotating member is manually rotated as additional operation which is not required for the 135 type of the lens-fitted photo film unit. If an operator forgets to rotate the rotating member, the undeveloped photo film is inevitably subjected to ambient light. There is a problem of possible errors in removal of the cassette with port shutter.

To manufacture the lens-fitted photo film unit, darkroom stations are used only for loading of the photo film cassette and securing of a rear cover, as it is favorable to reduce darkroom operation. An illuminated room is used for positioning and mounting of the rotating member. However, the housing with the rotating member must be conveyed from the illuminated room into the dark room. It is likely that the housing while conveyed is shocked or vibrated to deviate the position of the rotating member. A key shaft of the rotating member must be oriented equally to a key hole of the port shutter before they can be fitted together. The rotating member must be repositioned when in the dark room, which causes a problem of low efficiency in assemblage.

In operation of the manufacture, the lens-fitted photo film unit is assembled by directing the front of the housing downwards or upwards while the parts are mounted thereon: the rotating member to be disposed on the top of the cassette containing chamber is moved in assemblage in a horizontal direction toward the housing. A problem lies in that the rotating member is likely to be deviated in the axial direction, or more seriously, dropped away from the housing. The assemblage may require a support mechanism for the rotating member, or a system for rearranging the rotating member in the darkroom, to raise complexity of the assembling system or expense for the same.

SUMMARY OF THE INVENTION

In view of the foregoing problems, an object of the present invention is to provide a lens-fitted photo film unit inside which a photo film port shutter of a cassette can be rotated unfailingly to a closed position, and a method of producing the same.

Another object of the present invention is to provide a lens-fitted photo film unit and a method of producing the same, in which a rotating member for a photo film port shutter can be positioned easily and precisely during assemblage.

In order to achieve the above and other objects and advantages of this invention, a lens-fitted photo film unit has a cassette which incorporates a port shutter rotatable between a closed position of closing a photo film passage port and an open position of opening the passage port. The photo film is wound into the cassette as much as one frame each time one frame is exposed, and the cassette is removed from a cassette containing chamber after winding photo film entirely into the cassette. The lens-fitted photo film unit has an exit opening through which the cassette is removed from the cassette containing chamber. An openable lid is disposed to close the exit opening, and opened for the removal of the cassette. A port shutter rotating mechanism is connected to the port shutter from outside the cassette containing chamber, for rotating the port shutter from the open position to the closed position. A transmission mechanism transmits opening motion of the lid to the port shutter rotating mechanism, to set the port shutter in the closed position.

In the present invention, the photo film port shutter of the cassette can be rotated unfailingly to the closed position.

In a preferred embodiment, the exit opening is formed in a bottom of the cassette containing chamber. The port shutter rotating mechanism is disposed on a top wall of the cassette containing chamber.

The port shutter rotating mechanism includes a rotating member, engaged with the port shutter, and rotatable integrally with the port shutter, the rotating member having a first position when the port shutter has the open position, and a second position when the port shutter has the closed position. A bias member biases the rotating member from the first position to the second position.

The transmission mechanism includes a retainer member, extended from the lid toward the rotating member, disposed movably, and when the lid is closed, the retainer member retaining the rotating member in the first position against the bias member, wherein the retainer member is moved in response to the opening motion of the lid, to release the rotating member from retention, and the bias member rotates the port shutter to the second position.

To produce the lens-fitted photo film unit, the retainer member is combined with the rotating member, to retain the rotating member in the open position. The rotating member is mounted on the housing with the rotating member retained by the retainer member. The bias member is combined with the rotating member with the rotating member retained by the retainer member, to bias the rotating member against the retainer member, wherein the housing is conveyed with the rotating member, the retainer member and the bias member to where the housing is loaded with photo film and the cassette.

The rotating member for the photo film port shutter can be positioned easily and precisely during assemblage.

The present invention is further applicable to a lens-fitted photo film unit in which the rotating member is driven in response to operation different from the opening motion of the lid. The lens-fitted photo film unit includes a retainer member, disposed movably toward and away from the rotating member, contacted on the rotating member, for retaining the rotating member in the open position against the bias member. A releasing member moves the retainer member away from the rotating member during a period beginning when the photo film is exposed for a final frame, and ending when at least one portion of the cassette containing chamber is opened for removal of the cassette, wherein the rotating member is released from retention in the open position, and the bias member rotates the port shutter to the closed position.

BRIEF DESCRIPTION OF THE DRAWINGS

The above objects and advantages of the present invention will become more apparent from the following detailed description when read in connection with the accompanying drawings, in which:

FIG. 15 is a perspective illustrating a variant retainer rod with a cassette containing chamber;

FIG. 22 is a perspective illustrating another preferred embodiment including a retainer lever which retains a rotating member;

FIG. 23 is a perspective illustrating a released position of the rotating member;

FIG. 24 is a perspective illustrating a lens-fitted photo film unit with the retainer lever of FIGS. 22 and 23;

DETAILED DESCRIPTION OF THE PREFERRED EMBODIMENT(S) OF THE PRESENT INVENTION

Figure 1:
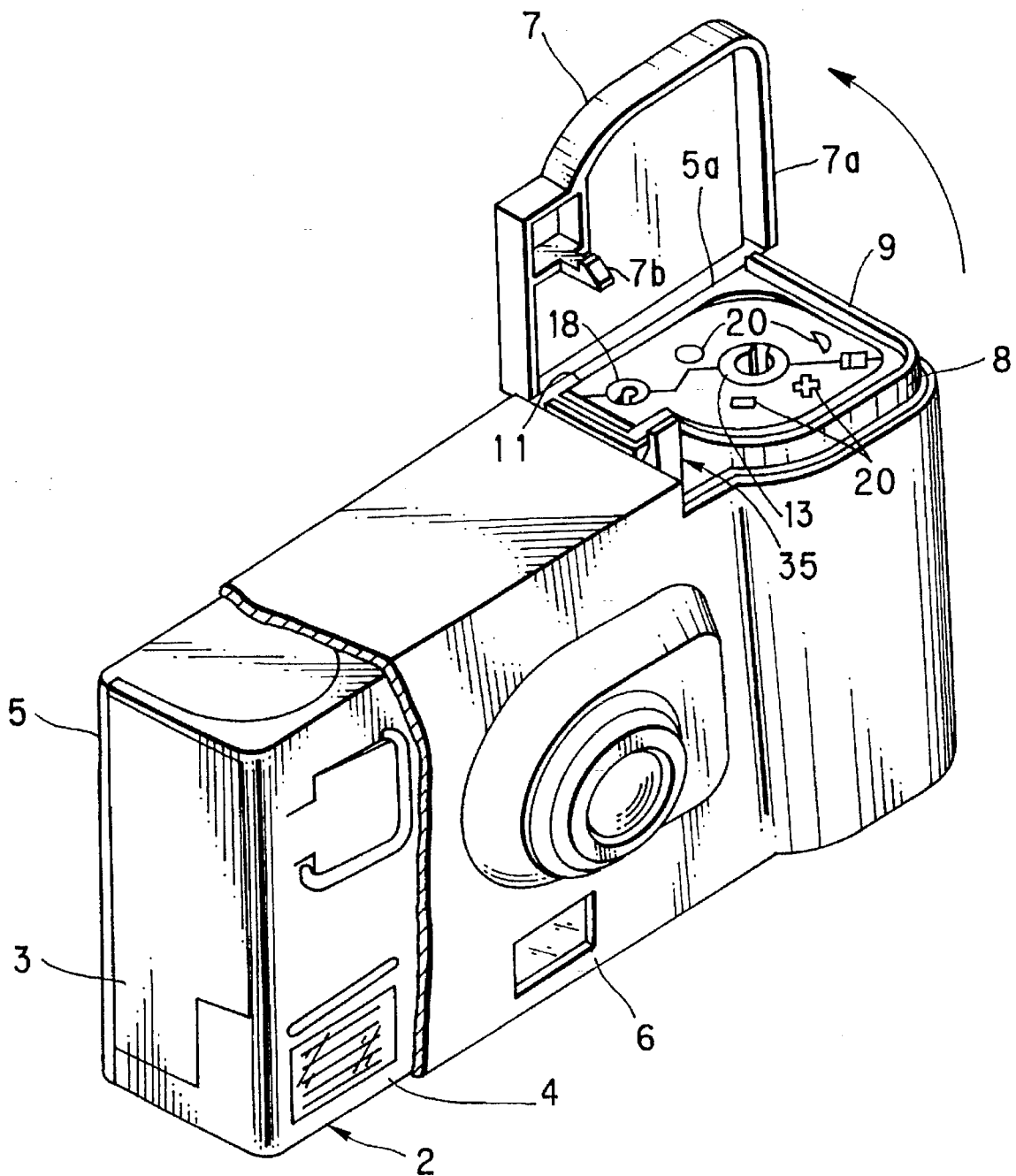
FIG. 1 is a perspective illustrating a lens-fitted photo film unit as viewed from a bottom thereof.

FIG. 1 illustrates a lens-fitted photo film unit and a photo film cassette for use therewith. The lens-fitted photo film unit is depicted in an upside-down orientation. As is described in detail, prior to removal of a cassette a bottom lid is opened. In response to the opening operation, a port shutter of the cassette, is rotated to a closed position.

A housing 2 includes a photo film containing unit 3 formed from resin in fashion known in the art, and front cover 4 and a rear cover 5 fitted on a front and a rear thereof. The photo film containing unit 3 also includes a shutter mechanism having a shutter blade, a photo film winding mechanism, and an electronic flash device. The front cover 4 covers the shutter mechanism mounted on the photo film containing unit 3. The rear cover 5 covers the rear of the photo film containing unit 3 in light-tight fashion.

The housing 2 is covered in a cardboard protective wrapper 6 for protection and decoration. There are trains of perforations (not shown) formed in the cardboard wrapper 6. To remove a cassette 11 after taking exposures, the cardboard wrapper 6 is torn along the perforation trains to cause a bottom lid 7 to emerge. The bottom lid 7 is opened as illustrated. The bottom lid 7 closes an exit opening formed in the bottom of a cassette containing chamber 8 formed in the housing 2. The bottom lid 7 is formed integrally with the rear cover 5 of the housing 2 as one piece. Around the bottom lid 7 is formed a light-shielding ridge 7a. An engaging hook 7b is formed integrally with the bottom lid 7 for engagement with a retainer rod 35 outside the cassette containing chamber 8 (See FIG. 2). Note that the cardboard wrapper 6 can be a sheet of vinyl, or other tearable material, for external access of the bottom lid 7 for the removing the cassette 11.

The light-shielding ridge 7a, when the bottom lid 7 is closed, cooperates with a light-shielding ridge 9 formed around the cassette containing chamber 8 to prevent entry of ambient light to the inside. The height of the light-shielding ridge 7a is determined in consideration of shielding light in cooperation with the light-shielding ridge 9. Before a port shutter 14 of the cassette 11 (See FIG. 2) is rotated to a closed position in response to the opening motion of the bottom lid 7, the cassette containing chamber 8 is shielded from ambient light. The bottom lid 7 has retaining hooks which enclose the exit opening of the cassette containing chamber 8 with the bottom lid 7, but which are not illustrated for reasons of simplicity.

Figure 2:
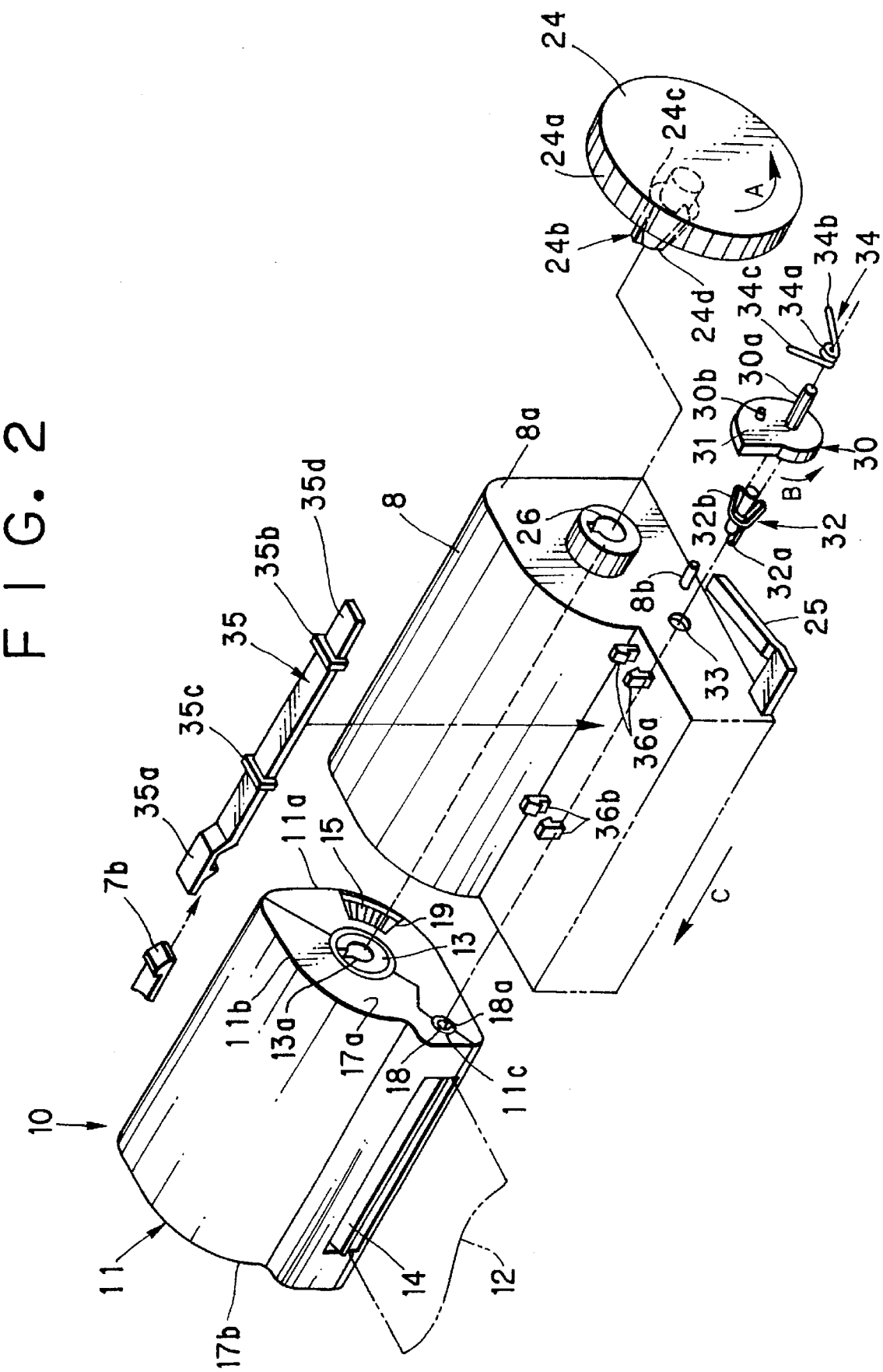
FIG. 2 is an exploded perspective illustrating a cassette and a cassette containing chamber of the lens-fitted photo film unit.
Figure 3:
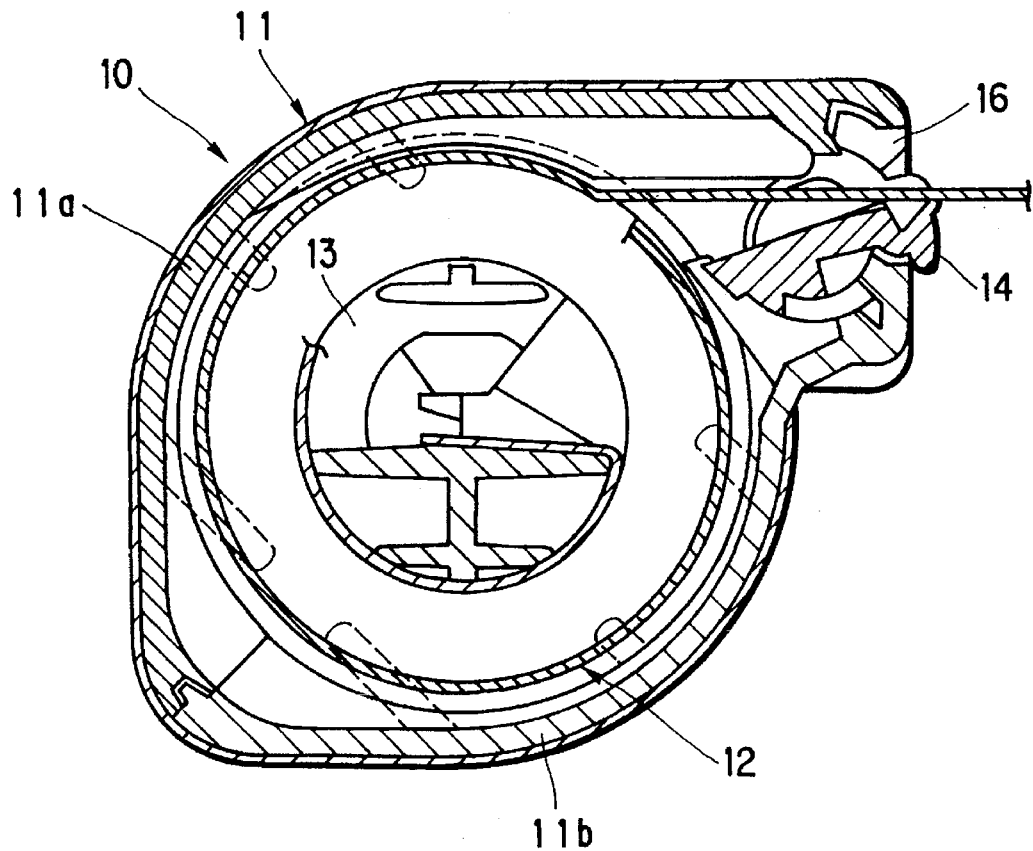
FIG. 3 is a cross section illustrating the cassette in which a port shutter has an open position.

In FIGS. 2 and 3, a photo film cassette 10 includes the cassette 11, a rotatable spool 13 on which photo film 12 is wound, and the port shutter 14 for avoiding entry of ambient light. The photo film cassette 10 also has a lock device for the port shutter 14, an indicator device for indicating one of using statuses of the photo film 12, and a bar code plate 15. The cassette 11 includes an upper shell half 11a and a lower shell half 11b respectively formed from resin and fitted together. A trailer of the photo film 12 is secured to the spool 13 in the photo film cassette 10. When the spool 13 is rotated in a direction to unwind the photo film 12, a leader of the photo film 12 about the spool 13 is advanced through a photo film passage port 16 to an outside of the cassette 11.

Figure 4:
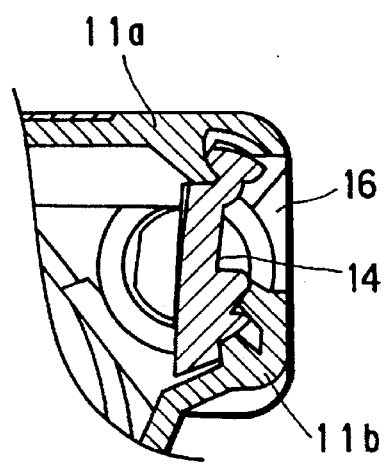
FIG. 4 is a cross section illustrating a closed position of the port shutter.

The port shutter 14 is rotatably contained in the passage port 16 formed between the shell halves 11a and 11b. Ends of the port shutter 14 respectively have a key hole 18 having a C-shape as viewed in cross section. The key hole 18 is adapted to external access to the port shutter 14 from outside the cassette 11. The key hole 18 emerges through bearing holes 11c formed respectively in a top end face 17a and a bottom end face 17b. The port shutter 14 is rotated between an open position of FIG. 3 and a closed position of FIG. 4 by a key shaft fitted in the key hole 18. The passage port 16 is open when in the open position, and closed in light-tight fashion when in the closed position.

As illustrated in FIG. 2, the bar code plate 15 consists of a disk having a bar code printed thereon for representing film sensitivity, photographable maximum number of frames, photo film type, and the like. The top end face 17a has a window 19 through which the bar code is readable. The indicator device indicates each of using statuses of the photo film 12 inside one of indicator windows 20 in FIG. 1. The using statuses associated with each of the indicator windows 20 are four statuses, including Unexposed, Partially Exposed, Exposed but Undeveloped, and Developed statuses.

Figure 5:
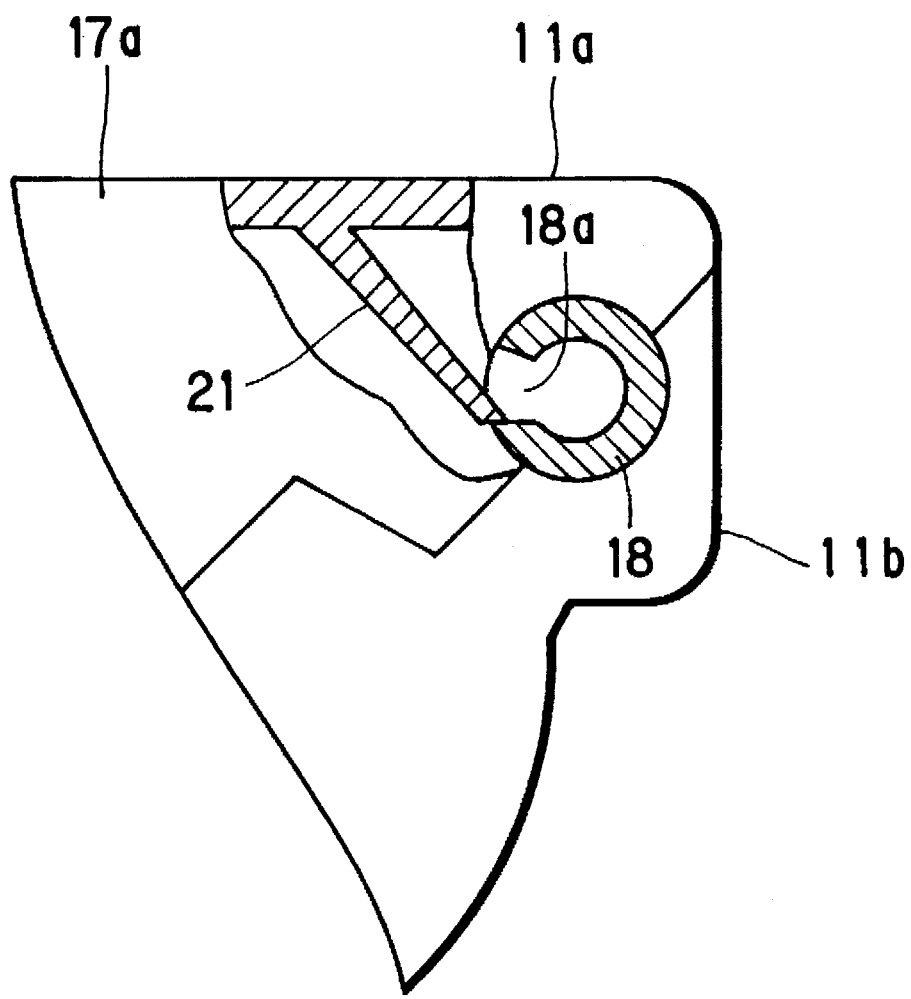
FIG. 5 is a partially cutaway plan illustrating the port shutter.

As illustrated in FIG. 5, the lock device of the port shutter 14 consists of an engaging notch 18a formed in the port shutter 14, and a lock claw 21 engaged with the engaging notch 18a for stopping the port shutter 14. Even when the port shutter 14 is subjected to an unwanted force, the port shutter 14 is kept from rotating from the closed position to the open position. Note that the cassette 11 can be loaded in a photo film processor for automatically developing the photo film. The photo film processor has a key shaft, which is inserted into the key hole 18, and presses the lock claw 21 out of the engaging notch 18a, so that the port shutter 14 is unlocked.

As illustrated in FIG. 2, a top wall 8a of the cassette containing chamber 8 has a winding wheel 24 for rotating the spool 13, and a rotating plate 30 for rotating the port shutter 14. The top wall 8a has a reversal preventing claw 25 of an L-shape. A periphery of the winding wheel 24 has a plurality of teeth 24a for avoiding slip in manual rotating operation. The reversal preventing claw 25 is engaged with the teeth 24a with resiliency, to prevent the winding wheel 24 from rotating in reverse to the arrow direction A of winding the photo film. The reversal preventing claw 25 operates also to regulate an assembled position of the winding wheel 24 when the winding wheel 24 is mounted on the top wall 8a.

The bottom of the winding wheel 24 has a key shaft 24b engaged with a key hole 13a for transmitting rotation to the spool 13. The periphery of the key shaft 24b has an engaging claw 24c, which is engaged with the inside of the top wall 8a of the cassette containing chamber 8, for preventing the winding wheel 24 from dropping from the top wall 8a. The key shaft 24b has a cutout 24d, which renders the engaging claw 24c deformable toward the axis of the winding wheel 24, and operates during insertion of the engaging claw 24c into a through hole 26, which is formed in the top wall 8a for the winding wheel 24.

Figure 6:
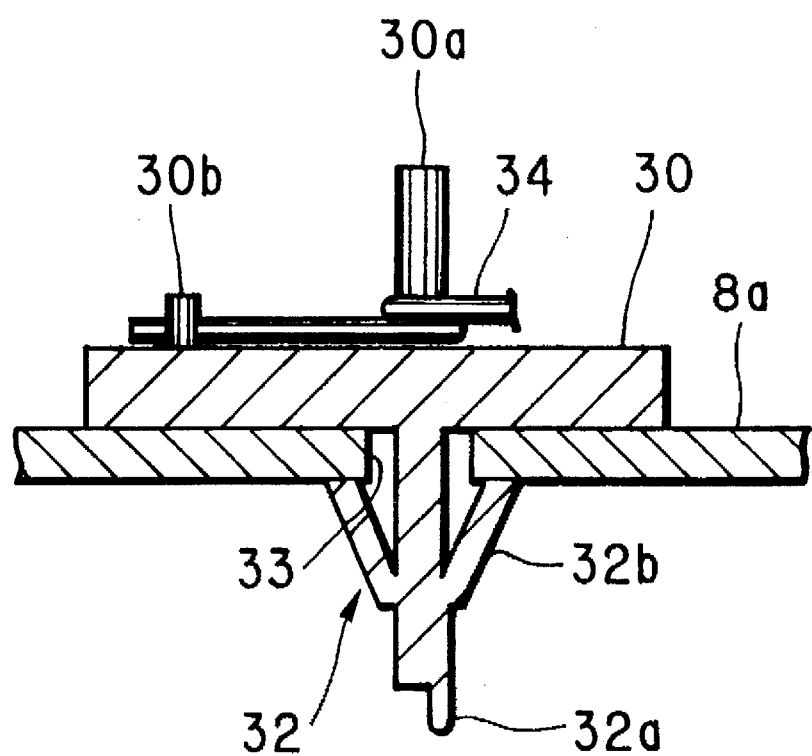
FIG. 6 is a cross section illustrating a rotating plate with a top wall of the cassette containing chamber.

To rotate the port shutter 14, the cassette containing chamber 8 incorporates the rotating plate 30, a torsion coil spring 34, and the retainer rod 35 for retaining rotation of the rotating plate 30. The rotating plate 30 has a portion projected in a radial direction, and includes a driven projection 31 for engagement with the retainer rod 35 and a key shaft 32 formed integrally with its bottom. There is formed a through hole 33 through which the key shaft 32 of the rotating plate 30 is inserted to mount the rotating plate 30 in rotatable fashion. The key shaft 32 has a bottom projection 32a and deformable engaging hooks 32b. The bottom projection 32a is engaged with the engaging notch 18a in the port shutter 14 inside the key hole 18. The engaging hooks 32b avoid disengaging the rotating plate 30 from the top wall 8a. In FIG. 6, the engaging hooks 32b are engaged with an inner face of the top wall 8a.

As illustrated in FIG. 2, a top of the rotating plate 30 has a support shaft 30a coaxial with the key shaft 32 and a securing pin 30b eccentric from the key shaft 32. The support shaft 30a is inserted into a torsion coil spring portion 34a of the torsion coil spring 34, and regulate a deformable range of the reversal preventing claw 25, to be described later in detail. The torsion coil spring 34 has two arm portions 34b and 34c. The arm portion 34b is fitted on a pin 8b projected over the top wall 8a. The arm portion 34c is fitted on the securing pin 30b, so as to bias the rotating plate 30 in the arrow direction B.

The retainer rod 35 includes two stopper projections 35b and 35c and a rod hook 35a, which is engaged with the engaging hook 7b of the bottom lid 7. Two pairs of rail hooks 36a and 36b are formed in front of the cassette containing chamber 8 and outside the passage port 16 of the cassette 11 as contained. The retainer rod 35 has a top end 35d, which is projected over the top wall 8a. The stopper projections 35b and 35c are located between the rail hooks 36a and 36b. The retainer rod 35 is pressingly inserted between the rail hooks 36a and between the rail hooks 36b. The rail hooks 36a and 36b support the retainer rod 35 in slidable fashion longitudinally.

Figure 7:
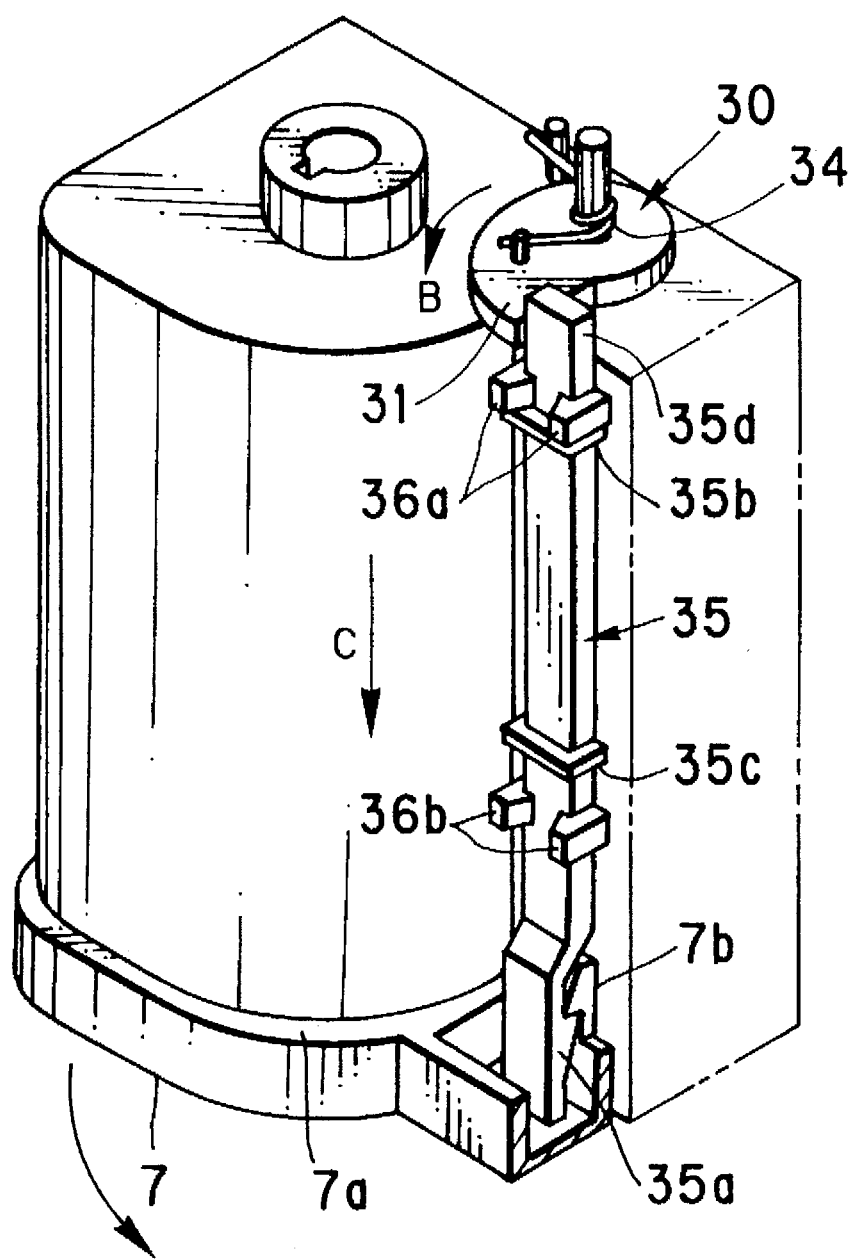
FIG. 7 is a perspective illustrating the cassette containing chamber with a retainer rod.

As illustrated in FIG. 7, the top end 35d projected over the top wall 8a retains the driven projection 31 of the rotating plate 30 biased in the arrow direction B by the torsion coil spring 34, to hinder the rotating plate 30 from rotating in the arrow direction B. It is sufficient in mounting the rotating plate 30 to orient it at a roughly estimated suitable angle. The rotating plate 30 can be positioned on the top wall 8a without precise external operation to position the rotating plate 30. After positioning the rotating plate 30, the rotating plate 30 is kept in the angular position even with vibration in transportation to posterior processes in manufacture of lens-fitted photo film units.

The rod hook 35a is engaged with the engaging hook 7b of the bottom lid 7 when the bottom lid 7 is closed. The stopper projection 35b is moved upwards, is contacted on the rail hooks 36a nearer to the top wall 8a, and hinders the retainer rod 35 from sliding upwards, to facilitate engagement of the rod hook 35a with the engaging hook 7b. When the bottom lid 7 is closed, the bottom end of the retainer rod 35 is contacted on the bottom lid 7, and is hindered from sliding downwards in the arrow direction C. The top end 35d is kept projected over the top wall 8a.

The stopper projection 35c is contacted on the rail hooks 36b when the port shutter 14 comes to the closed position, namely the retainer rod 35 is slid down to release the driven projection 31 from retention of the rod hook 35a. The retainer rod 35 is kept from dropping away even when the bottom lid 7 is open.

Figure 8:
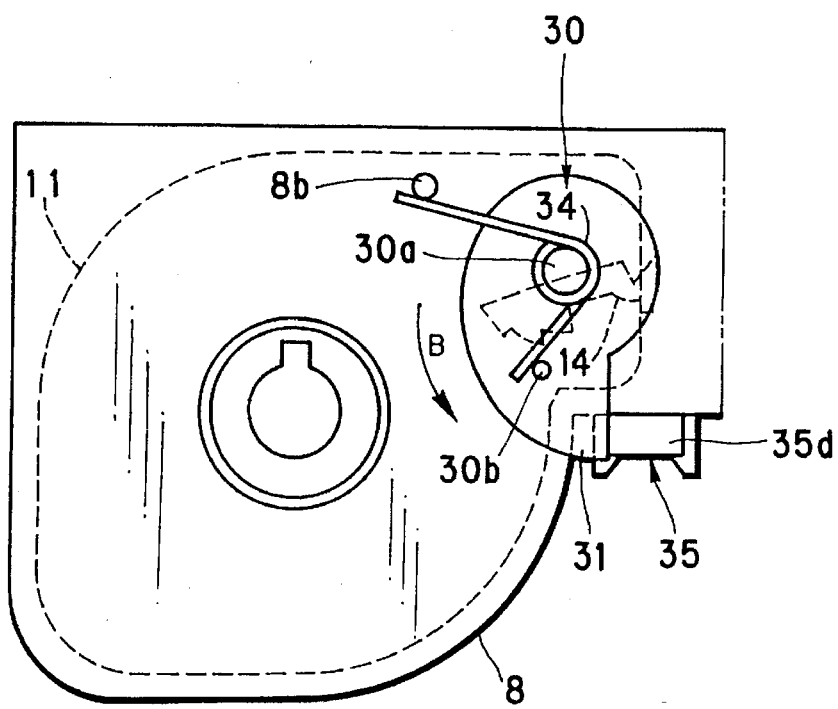
FIG. 8 is a plan illustrating a retained position of the rotating member located on the top wall.

When the driven projection 31 is retained on the top end 35d of the retainer rod 35, the key shaft 32 has such an angular position that the bottom projection 32a is engageable with the engaging notch 18a at the key hole 18 in insertion of the cassette 11 into the cassette containing chamber 8 with the port shutter 14 open. As illustrated in FIG. 8, the cassette 11 with the port shutter 14 open does not require adjusting the angular position of the rotating plate 30 before the key shaft 32 can be inserted in the key hole 18 emerging in the top end face 17a of the cassette 11. After insertion of the cassette 11, the port shutter 14 is kept open.

Figure 10:
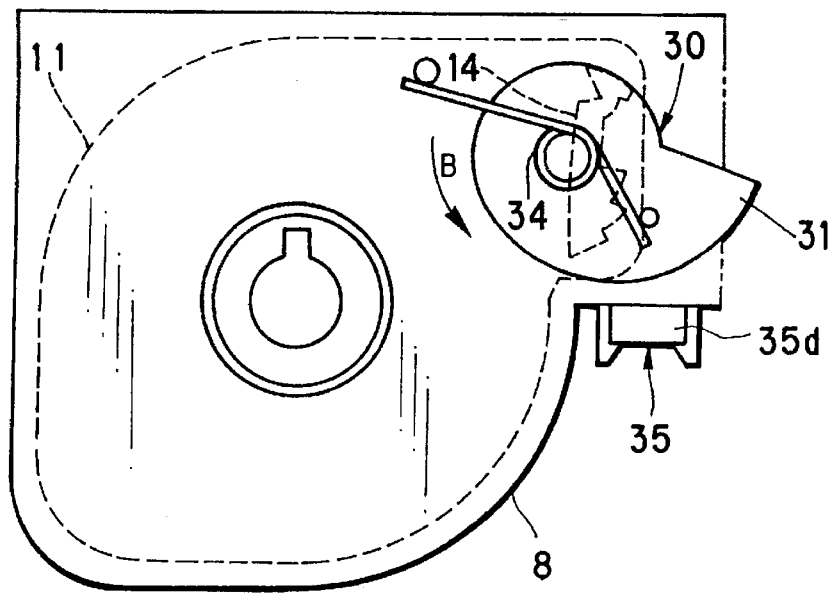
FIG. 10 is a plan illustrating a released position of the rotating member located on the top wall.
Figure 9:
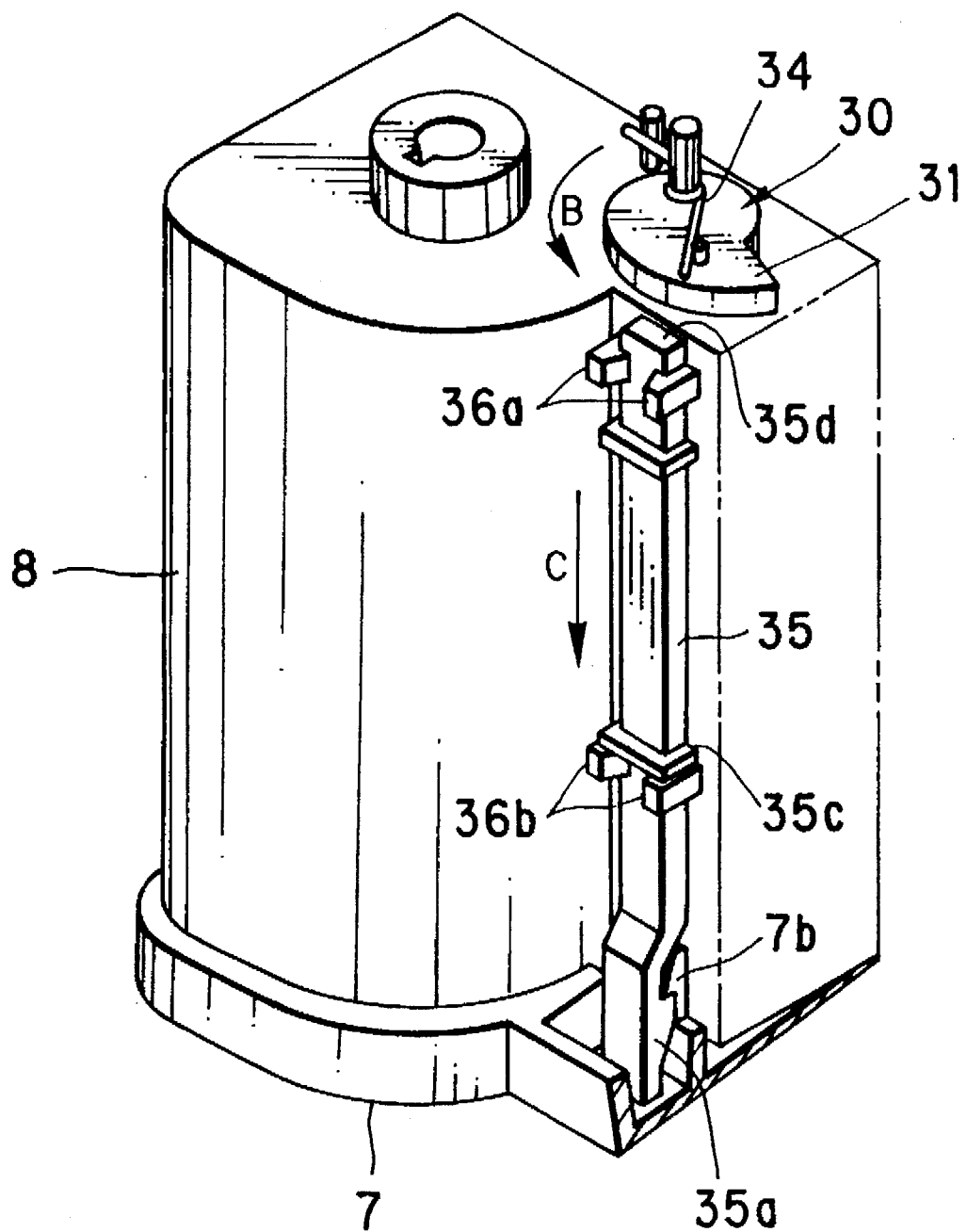
FIG. 9 is a perspective illustrating a start of opening a bottom lid under the retainer rod.

When the cassette 11 is removed from the housing 2, the bottom lid 7 is rotated by a screwdriver or the like and opened. As illustrated in FIG. 9, the engaging hook 7b slides the retainer rod 35 in the arrow direction C via the rod hook 35a. The top end 35d is disengaged from the driven projection 31, to allow the rotating plate 30 to rotate in the arrow direction B. The bias of the torsion coil spring 34 rotates the rotating plate 30 in the arrow direction B. As illustrated in FIG. 10, the port shutter 14 is instantaneously rotated to the closed position.

Figure 11A:
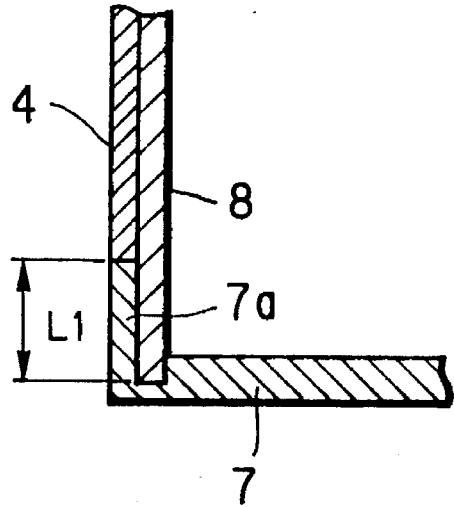
FIG. 11A is a section illustrating a light-shielding ridge on the bottom lid.
Figure 11B:
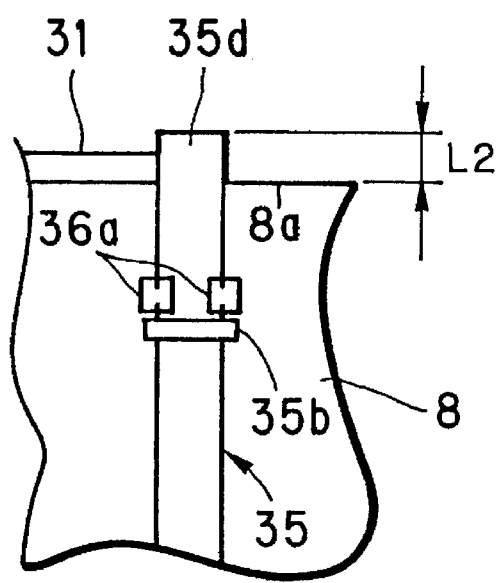
FIG. 11B is a front elevation illustrating a projected status of a top end of the retainer rod.

In FIG. 11A, let the light-shielding ridge 7a of the bottom lid 7 be as high as L1. In FIG. 11B, let the top end 35d be projected over the top wall 8a as much as L2. The light-shielding ridge 7a is formed so that L1>L2. Accordingly the inside of the cassette containing chamber 8 is protected from ambient light even at the moment that the port shutter 14 comes to the closed position.

As illustrated in FIG. 9, slide of the retainer rod 35 in the arrow direction C is restricted by contact between the stopper projection 35c and the rail hooks 36b after the port shutter 14 has rotated to the closed position. Further force is applied to the bottom lid 7 to disengage the engaging hook 7b from the rod hook 35a, otherwise to break the engaging hook 7b away from the bottom lid 7. Or the stopper projection 35c bends away the rail hooks 36b such that the retainer rod 35 is pulled out. Thus the bottom lid 7 is opened fully. The cassette 11 can be removed through the exit opening of the cassette containing chamber 8. In the removal, the port shutter 14 is rotated to the closed position, to cause the lock device to lock the port shutter 14. It is possible to remove the cassette 11 from the cassette containing chamber 8 with the port shutter 14 closed completely.

The port shutter 14 of the cassette 11 is rotated by the bias of the torsion coil spring 34 via the rotating plate 30 engaged with one of the key hole 18 in the top end face 17a. In the present invention, the port shutter 14 is operated through the top end face 17a and not through the bottom end face 17b. Should the port shutter 14 be operated through the bottom end face 17b, the one of the key hole 18 in the top end face 17a would be likely not to rotate so much as an expected angle, because the port shutter 14 would be distorted. The lock claw 21 would be not received in the engaging notch 18a, and the port shutter 14 would fail to be locked.

It is inevitable that operation of opening the bottom lid 7 pulls down the retainer rod 35 to break the rail hooks 36b or break the engaging hook 7b. After removing the photo film cassette 10 from the lens-fitted photo film unit with exposures taken, it is impossible to load it with an unused photo film cassette 10. This makes it possible to avoid unauthorized recycling of the lens-fitted photo film unit.

Figure 12:
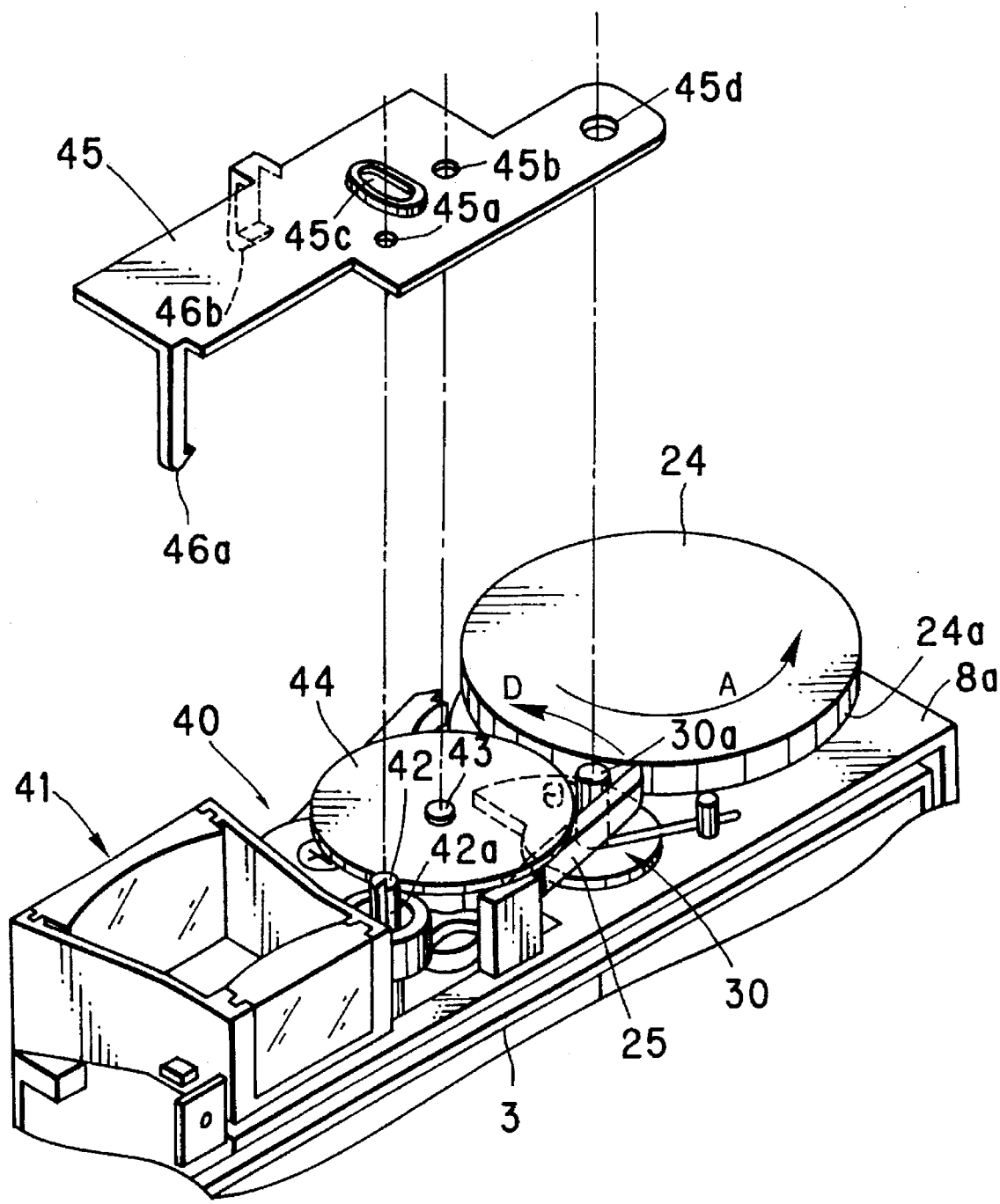
FIG. 12 is an exploded perspective illustrating the rotating plate on a housing and a cover plate to be placed.

FIG. 12 illustrates combination of an exposure-taking unit 40 and the photo film containing unit 3 with the shutter mechanism, the photo film winding mechanism and a viewfinder 41 mounted on the exposure-taking unit 40 and with the winding wheel 24 and the rotating plate 30 mounted on the photo film containing unit 3. A top of the exposure-taking unit 40 has the viewfinder 41, a cam shaft 42 and a frame counter plate 44. The cam shaft 42 has a one-toothed gear 42a rotated by winding of the photo film 12. The frame counter plate 44 is rotated about a shaft 43 as much as to step up or down by one for one frame feeding of the photo film 12. As described above, the reversal preventing claw 25 is pressed against the teeth 24a and engaged therewith resiliently. The support shaft 30a of the rotating plate 30 is disposed on the front of the photo film containing unit 3 and near to the reversal preventing claw 25.

The reversal preventing claw 25 has such rigidity in its longitudinal direction as to hinder the winding wheel 24 from rotating in reverse to the arrow direction A of winding the photo film. It is inevitable that the reversal preventing claw 25 is deformed to a small extent in the arrow direction D resiliently by force of the winding wheel 24. Should the deformation be excessive, the force of the winding wheel 24 would be ineffective to the reversal preventing claw 25, which would be further deformed lightly in the arrow direction D. The reversal preventing claw 25 would fail to effect its proper function, as the winding wheel 24 would rotate in reverse without hindrance.

A conventional lens-fitted photo film unit has had a regulating pin on the top wall 8a for the purpose of preventing the reversal preventing claw 25 from moving in the arrow direction D. However the present invention cannot have such a regulating pin on the top wall 8a, because the rotating plate 30 must be mounted in place of the regulating pin. In the present invention, the support shaft 30a of the rotating plate 30 is used for regulating the reversal preventing claw 25: the reversal preventing claw 25 is contacted on the support shaft 30a when shifted in the arrow direction D by rotation of the winding wheel 24 in reverse to the winding direction. The support shaft 30a renders it reliable to hinder the winding wheel 24 from rotating in reverse to the winding direction.

A cover plate 45 is mounted on the top of the exposure-taking unit 40. The cover plate 45 has holes 45a and 45b for respective insertion of the cam shaft 42 and the shaft 43. The holes 45a and 45b operate for supporting the cam shaft 42 and 43 axially without deviation, to keep the frame counter plate 44 in mesh with the one-toothed gear 42a. A lens 45c is disposed inside a window in the cover plate 45 located on the frame counter plate 44. The lens 45c is confronted with an indicator window (not shown) formed in a top of the housing 2. The lens 45c enlarges numbers of the frame counter plate 44 to facilitate external observation of the frame counter plate 44. Reference numerals 46a and 46b designate engaging hooks for securing the cover plate 45 to the exposure-taking unit 40.

A receiving hole 45d is formed in the cover plate 45 for receiving insertion of a top end of the support shaft 30a. The receiving hole 45d supports the top end of the support shaft 30a in such fashion that a root of the support shaft 30a is not broken even with unwanted considerable force from the reversal preventing claw 25 in the arrow direction D.

Figure 13:
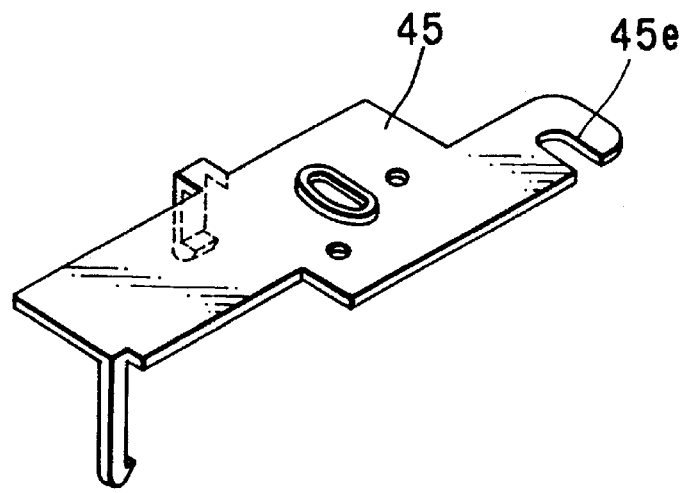
FIGS. 13 and 14 are perspectives illustrating other preferred cover plates.
Figure 14:
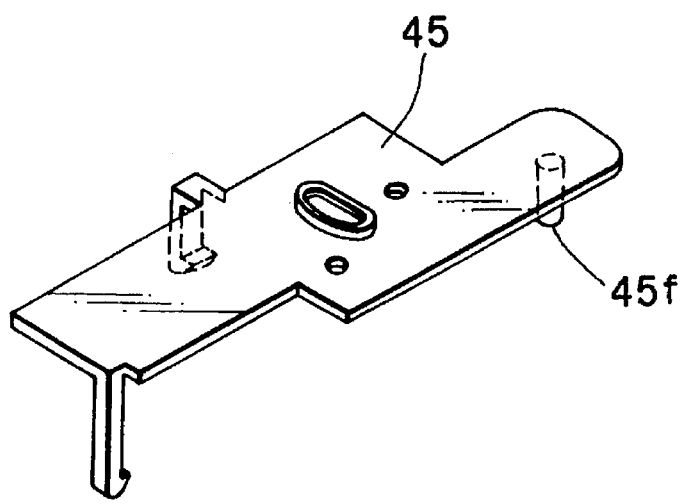

Note that the support shaft 30a receives force from the reversal preventing claw 25 only in the arrow direction D. It is possible instead of the receiving hole 45d to form a receiving hole 45e open toward the rear as illustrated in FIG. 13. It is further possible that the cover plate 45 has an auxiliary regulating pin 45f, projected downwards, for contact on the reversal preventing claw 25 when the reversal preventing claw 25 is shifted in the arrow direction D by rotation of the winding wheel 24 in reverse to the winding direction. This has an advantage in that a position of the regulating pin 45f can be determined irrespective of the rotating plate 30 and in view of effectiveness relative to the position of the reversal preventing claw 25. It is of course possible to eliminate the support shaft 30a from the rotating plate 30 when the regulating pin 45f is used.

Operation of the above is described now. The assemblage of the housing 2 is effected in an illuminated room except for mounting of the rear cover 5 and the loading of the photo film cassette 10. The photo film containing unit 3 is conveyed with the front orientated upwards or downwards. The retainer rod 35, the rotating plate 30, the winding wheel 24, the exposure-taking unit 40 and the flash device are mounted.

The retainer rod 35 is mounted on a front of the cassette containing chamber 8. It is easily possible to mount the retainer rod 35 on the cassette containing chamber 8, as the retainer rod 35 has only to be pressingly inserted between the rail hooks 36a and between the rail hooks 36b. Both of the stopper projections 35b and 35c are positioned between the rail hooks 36a and 36b. The top end 35d is placed to project over the top wall 8a. The photo film containing unit 3 with the retainer rod 35 mounted is conveyed to a station for assembling the rotating plate 30. It is preferable that the photo film containing unit 3 is placed on a pallet, and that the retainer rod 35 is fixedly supported by a support jig while the photo film containing unit 3 is conveyed, to prevent the retainer rod 35 from being displaced.

In mounting the rotating plate 30, the reversal preventing claw 25 is deformed resiliently to the rear. The key shaft 32 of the rotating plate 30 is pressed into the through hole 33 formed in the top wall 8a. The engaging hooks 32b of the key shaft 32 are deformed, and insertable with great ease. As illustrated in FIG. 6, the engaging hooks 32b of the key shaft 32 is engaged with the inside of the top wall 8a. Even if the rotating plate 30 is shocked or vibrated during conveyance, the rotating plate 30 does not drop away from the top wall 8a of the cassette containing chamber 8.

The torsion coil spring portion 34a of the torsion coil spring 34 is fitted about the support shaft 30a with the rotating plate 30 oriented in a suitable angular position. The arm portion 34b is fitted on the pin 8b of the top wall 8a. The arm portion 34c is fitted on the securing pin 30b of the rotating plate 30. The rotating plate 30 is rotated by the bias of the torsion coil spring 34 in the arrow direction B, contacted on the top end 35d of the retainer rod 35, and stopped from rotation. The torsion coil spring 34 is sufficiently shifted from a free position, and biases the rotating plate 30 in the arrow direction B. The key shaft 32 is set in the predetermined angular position associated with the angular position of the key hole 18 of the open position of the port shutter 14. Note that it is possible to mount the torsion coil spring 34 on the rotating plate 30 before mounting the cassette containing chamber 8 on the rotating plate 30.

After mounting of the torsion coil spring 34, the winding wheel 24 is positioned at the predetermined angle. The key shaft 24b is pressed into the through hole 26. The engaging claw 24c of the key shaft 24b is deformed by the cutout 24d to facilitate the insertion of the key shaft 24b. The engaging claw 24c is engaged with the inside of the top wall 8a. The winding wheel 24 is kept inserted in the position even if shocked or vibrated externally. The reversal preventing claw 25 is resiliently engaged with the teeth 24a of the winding wheel 24. The winding wheel 24 is kept from rotating even if shocked or vibrated. It is possible to maintain the angular position of the assembling time.

After mounting of the winding wheel, the exposure-taking unit 40 on which the viewfinder 41, the cam shaft 42 and the frame counter plate 44 are mounted is fitted on the front of the photo film containing unit 3. The cover plate 45 is fitted on the exposure-taking unit 40 to support the cam shaft 42, the shaft 43 and the support shaft 30a respectively in the holes 45a and 45b and the receiving hole 45d. The flash device is fitted thereon next. A dry battery for the flash device is inserted under the photo film containing unit 3. The front cover 4 is fitted on the photo film containing unit 3 to cover the front of the flash device and the battery. Note that it is possible to insert the dry battery after loading of the photo film cassette 10.

After mounting the front cover 4, the photo film containing unit 3 is conveyed to a darkroom station for loading of the photo film cassette 10. The angular position of the key hole 13a of the spool 13 is fixedly set. The port shutter 14 is set in the open position. The cassette 11 is inserted into the cassette containing chamber 8 in an upward direction through the bottom.

The winding wheel 24 is stopped by the reversal preventing claw 25 from rotating during conveyance. The key shaft 24b has the predetermined angular position. The rotating plate 30 may be shocked or vibrated during conveyance and rotated opposite to the arrow direction B. However the bias of the torsion coil spring 34 rotates the rotating plate 30 in the arrow direction B, and returns it to the predetermined angular position for retention by the retainer rod 35. The rotating plate 30 is retained by the top end 35d, and kept from rotating in the arrow direction B away from the angular position.

The angular positions of the winding wheel 24 and the rotating plate 30 do not require adjusting. The cassette containing chamber 8 can be loaded with the cassette 11 with ease by engaging the key shaft 24b with the key hole 13a, and engaging the key shaft 32 with the key hole 18.

The photo film 12 is drawn from the cassette 11 and wound as a roll, which is included in a roll chamber (not shown) in the photo film containing unit 3. The roll chamber is such as disclosed in U.S. Pat. No. 5,452,036. The rear cover 5 is fitted behind the photo film containing unit 3. The bottom lid 7 is swung about the hinge portion 5a (See FIG. 1), to close the exit opening of the cassette containing chamber 8. The bottom lid 7 is closed. The rod hook 35a of the retainer rod 35 is engaged with the engaging hook 7b of the bottom lid 7. The upward slide of the retainer rod 35, in reverse to the arrow direction C of FIG. 7, is restricted by contact of the stopper projection 35b of the retainer rod 35 with the rail hooks 36a. The rod hook 35a is reliably engaged with the engaging hook 7b.

The bottom lid 7 is completely closed. The bottom end of the retainer rod 35 is contacted on the bottom lid 7. The retainer rod 35 is kept from sliding downwards. The top end 35d is kept projected over the top wall 8a. The rotating plate 30 is kept retained while the port shutter 14 is set in the open position. The bottom lid 7 is closed to shield the inside of the photo film containing unit 3 from ambient light, so that the housing 2 is completed. The housing 2 is conveyed into an illuminated room, inspected for performance of various items, and then provided with the cardboard wrapper 6, to complete a product of lens-fitted photo film unit.

The lens-fitted photo film unit is sold to a user, and used for exposing the photo film 12. After taking each exposure, the winding wheel 24 is rotated in the winding direction of the arrow A, to wind an exposed portion of the photo film 12 into the cassette 11. Even if the user applies rotational force to the winding wheel 24 in reverse to the winding direction, the force is received via the teeth 24a by the reversal preventing claw 25, which in turn operates to hinder the winding wheel 24 from rotating in the arrow direction A. If the reversal preventing claw 25 is deformed resiliently in the arrow direction D, the reversal preventing claw 25 is contacted on the support shaft 30a and kept from further deformation. Accordingly the reversal preventing claw 25 is not shifted enough to allow rotating the winding wheel 24 in reverse. The top of the support shaft 30a is supported by the receiving hole 45d, and is not broken even with great force applied thereto.

After taking available exposures on the photo film 12, the preparatory operation inevitably prior to the removal of the cassette 11 is effected. The winding wheel 24 is rotated continuously in the arrow direction A. The photo film 12 inclusive of the leader is contained in the cassette 11. The user having used the lens-fitted photo film unit deposits it to a photofinisher of a photo laboratory, and orders him to develop the photo film and make photographic prints. It is possible that the winding wheel 24 is continuously rotated by the photofinisher instead of the user. It is desirable in the photo laboratory to rotate the winding wheel 24 even after the user has rotated it, for the purpose of checking safety in removal of the cassette 11 having included the photo film 12. In the photo laboratory, the bottom lid 7 of the lens-fitted photo film unit as deposited is opened, to remove the cassette 11 having the photo film 12. To open the bottom lid 7, a portion of the cardboard wrapper 6 outside the bottom lid 7 is torn. The bottom lid 7 is opened with a screwdriver by swinging about a hinge portion 5a.

The bottom lid 7 is opened to a small extent. The retainer rod 35 is slid down in the arrow direction C via the engaging hook 7b and the rod hook 35a. As illustrated in FIG. 9, the driven projection 31 is release from retention of the top end 35d. The bias of the torsion coil spring 34 rotates the rotating plate 30 in the arrow direction B. The key shaft 32 of the rotating plate 30 rotates in the arrow direction B. The port shutter 14 is rotated to the closed position by cooperation of the key shaft 32 and the key hole 18. As illustrated in FIG. 10, the port shutter 14 is instantaneously rotated to the closed position. While the port shutter 14 has the closed position, the light-shielding ridge 7a of the bottom lid 7 keeps the inside of the cassette containing chamber 8 from ambient light. The photo film 12 is not exposed during this opening operation.

The driven projection 31 is released from retention of the top end 35d. The port shutter 14 is rotated to the closed position. Then the stopper projection 35c is contacted to the rail hooks 36b. There occurs resistance to operation of opening the bottom lid 7. Further force applied to the bottom lid 7 breaks the engaging hook 7b, or disengages the rod hook 35a from the engaging hook 7b, or breaks the rail hooks 36b to pull down the retainer rod 35. The bottom lid 7 is completely opened to cause the exit opening of the cassette containing chamber 8 to emerge. The cassette 11 is removed from the cassette containing chamber 8 through its bottom. The port shutter 14 is locked by the lock claw 21. Even if the port shutter 14 is shocked or vibrated during the removal, the port shutter 14 does not rotate to the open position. The photo film 12 as contained with the port shutter 14 closed is protected from ambient light, while the cassette 11 having the photo film 12 is removed from the cassette containing chamber 8.

FIG. 15 illustrates another preferred embodiment in which a retainer rod is prevented from moving accidentally. Elements similar to those of the above embodiment are designated with identical reference numerals. A retainer rod 50 is supported by the rail hooks 36a and 36b in slidable fashion. A rod hook 50a at a bottom end of the retainer rod 50 is engaged with an engaging hook 7c of the bottom lid 7. When the bottom lid 7 is opened, the retainer rod 50 is slid downwards in the arrow direction C.

A top end 50b of the retainer rod 50 is projected over the top wall 8a. The retainer rod 50 is mounted in a position to retain the driven projection 31 of the rotating plate 30 in an angular position associated with the open position of the port shutter 14. The retainer rod 50 has stopper projections 50c, projected under the rail hooks 36b and crosswise to the retainer rod 50, to define a width greater than a gap between the rail hooks 36b. Prior to engagement of the engaging hook 7c with the rod hook 50a, the stopper projections 50c hinder the retainer rod 50 from sliding upwards. After the mounting of the retainer rod 50, the stopper projections 50c keep the retainer rod 50 from sliding upwards when shocked or vibrated during the conveyance.

The retainer rod 50 has other stopper projections 50d, projected in a position over the rail hooks 36b and crosswise to the retainer rod 50, to define a width greater than a gap between the rail hooks 36b. The width defined by the stopper projections 50d is increased upwards from the rail hooks 36b. When the retainer rod 50 is pulled down to open the bottom lid 7, the stopper projections 50d spread the rail hooks 36b horizontally with resiliency and develops resistance against which the retainer rod 50 slides downwards: the stopper projections 50d allow sliding the retainer rod 50 in response to great force to pull down the retainer rod 50. However, the stopper projections 50d disable the retainer rod 50 from sliding when there is small downward force for the retainer rod 50. If external shock or vibration moves down the retainer rod 50 for the stopper projections 50d to spread the rail hooks 36b, the recovering force of the rail hooks 36b is converted by the stopper projections 50d to upward force for the retainer rod 50. The stopper projections 50d therefore stabilize the position of mounting the retainer rod 50 in consideration of shock or vibration during conveyance. The stopper projections 50c and 50d prevent the retainer rod 50 in cooperation with the rail hooks 36b from sliding up or down in vibration or shock due to the transportation, so that the retainer rod 50 is kept in the assembled position. A top end of the stopper projections 50d has a width decreasing upwards. After the retainer rod 50 comes to a position of disengagement from the rotating plate 30, it is possible to slide the retainer rod 50 and open the bottom lid 7 lightly and smoothly.

It is possible even without a support jig to hold the retainer rod 50 in the mounted position during the conveyance involving shock or vibration. Should the retainer rod 50 be slid downwards, the retainer rod 50 would be disengaged from the rotating plate 30. This would make it impossible to load the cassette 11. However the stopper projections 50d of the present invention reliably overcomes this problem. The mounting of the retainer rod 50 in the present embodiment is also easy like the former preferred embodiment. The retainer rod 50 shaped according to the present embodiment makes it possible to avoid displacement of the retainer rod 50 between the rail hooks 36b without providing the photo film containing unit 3 with portions for avoidance.

In removal of the cassette 11, the bottom lid 7 is opened like the above embodiment. The engaging hook 7c slides the retainer rod 50 in the arrow direction C via the rod hook 50a. The stopper projections 50d spread the rail hooks 36b resiliently, are moved down away from the rail hooks 36a, while the retainer rod 50 slides down. The driven projection 31 is released from retention of the top end 50b. The rotating plate 30 is rotated by the torsion coil spring 34 in the arrow direction B, to rotate the port shutter 14 to the closed position from the open position. The bottom lid 7 is completely opened. The cassette 11 is removed from the cassette containing chamber 8.

Instead of the stopper projections 50d, it is possible to form semi-spherical projections projected on the retainer rod 50 in its width direction, to avoid sliding the retainer rod 50 upwards when shocked, and to allow sliding downwards when the bottom lid 7 is opened. It is also possible for the retainer rod 50 to have semi-spherical projections projected toward the cassette containing chamber 8. When the top end 50b has a position of retaining the driven projection 31, the semi-spherical projections click into notches formed in the cassette containing chamber 8. In any of those structures, it is possible easily to retain the retainer rod 50 in an assembling position.

Still another preferred embodiment is described now, in which a spring is used for sliding a retainer rod. Elements similar to those of the above embodiments are designated with identical reference numerals.

Figure 16:
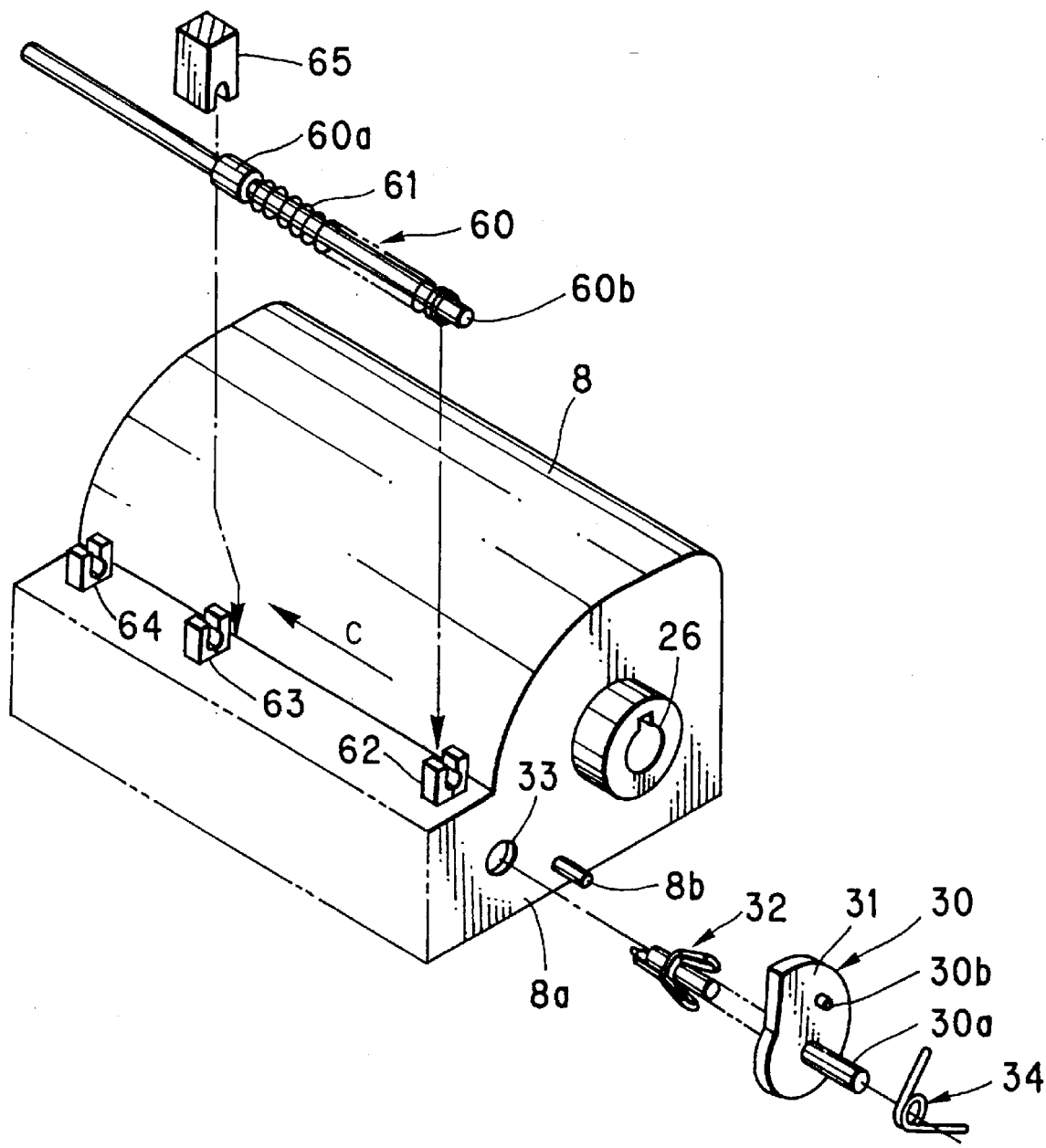
FIG. 16 is an exploded perspective illustrating another preferred retainer rod with a cassette containing chamber.

In FIG. 16, a retainer rod 60 has a thickened portion 60a having a greater diameter. The retainer rod 60 is inserted in a cylindrical coil spring 61, which is located between the thickened portion 60a and a top end 60b. The thickened portion 60a has a diameter greater than that of the cylindrical coil spring 61. Three pairs of rail hooks 62, 63 and 64 are formed in front of the cassette containing chamber 8. The cylindrical coil spring 61 is located between the rail hooks 62 and 63. The retainer rod 60 is pressingly inserted between the rail hooks 62, between the rail hooks 63 and between the rail hooks 64. The rail hooks 62, 63 and 64 support the retainer rod 60 in slidable fashion longitudinally.

With the retainer rod 60 mounted, a distal end of the cylindrical coil spring 61 is contacted on a bottom of the rail hooks 62. Another distal end of the cylindrical coil spring 61 is contacted on a top of the thickened portion 60a. The cylindrical coil spring 61 biases the retainer rod 60 in the arrow direction C. Note that, in assemblage of the retainer rod 60, a spacer 65 is inserted between the thickened portion 60a and the rail hooks 63, to project the top end 60b over the cardboard wrapper 6a. Before closing a bottom lid 66 (See FIG. 17), the top end 60b retains the driven projection 31 of the rotating plate 30. The spacer 65 is pulled away after the bottom lid 66 is closed.

Figure 17:
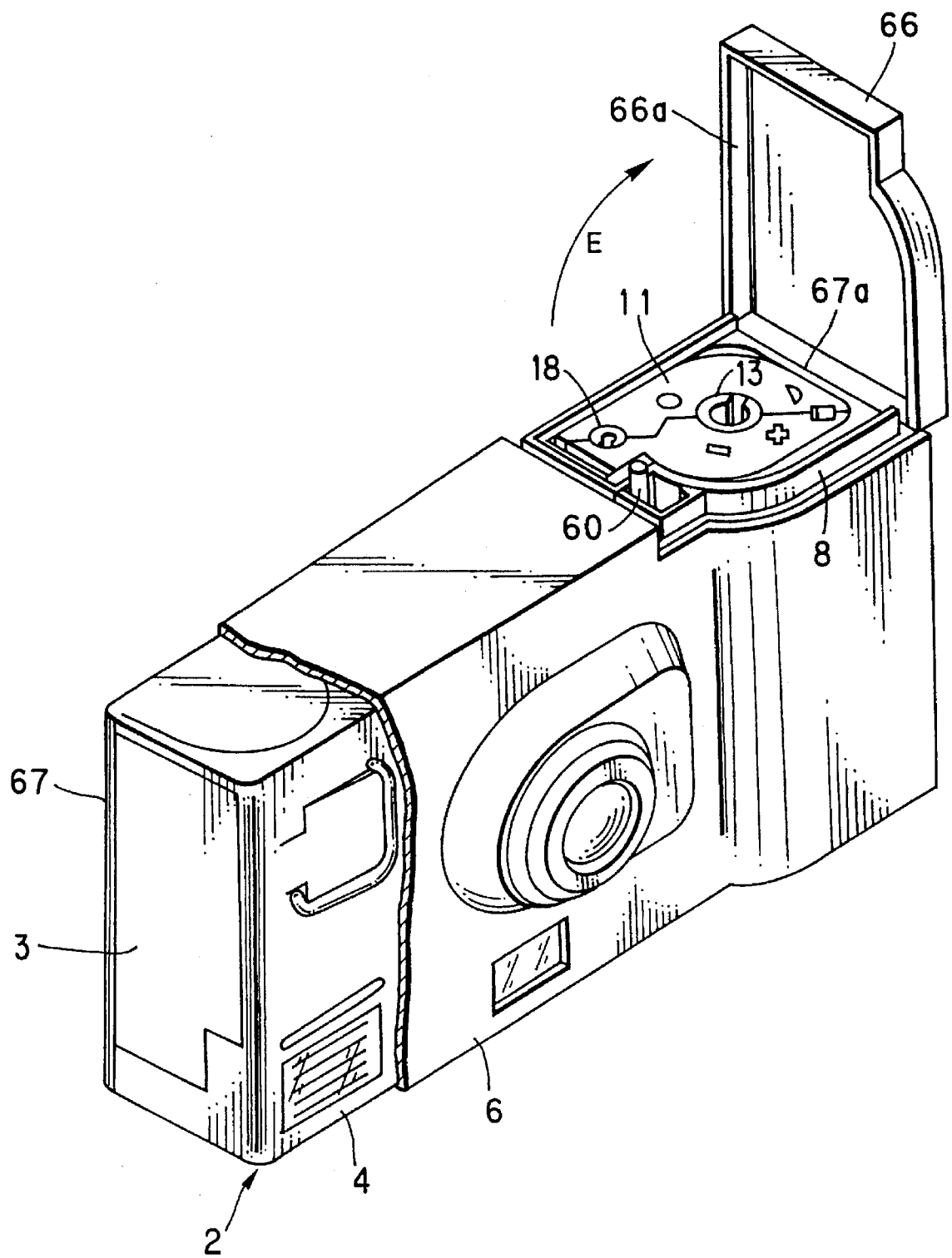
FIG. 17 is a perspective illustrating a lens-fitted photo film unit with the retainer rod of FIG. 16.

FIG. 17 illustrates a bottom of the lens-fitted photo film unit. The bottom lid 66 is formed integrally with a rear cover 67, and swung open about a hinge portion 67a in the arrow direction E. The bottom lid 66 has a light-shielding ridge 66a, which protects the inside of the cassette containing chamber 8 from ambient light before the port shutter 14 comes to have the closed position.

Figure 18:
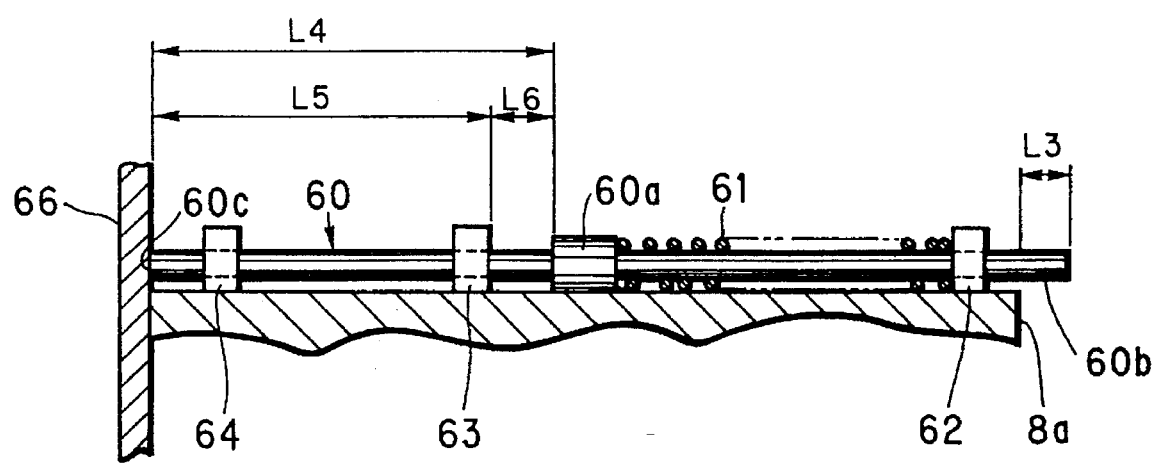
FIG. 18 is an explanatory view illustrating the retainer rod in relation with rail hooks.

In FIG. 18, when the bottom lid 66 is closed, a bottom end 60c of the retainer rod 60 contacts on the inner face of the bottom lid 66. The top end 60b is projected over the top wall 8a as much as L3 against the bias of the cylindrical coil spring 61. A bottom of the thickened portion 60a is located L4 distant from the bottom end 60c of the retainer rod 60. The rail hooks 63 have a top located L5 distant from the inner face of the bottom lid 66. When the bottom lid 66 is closed, there is an interval as long as L6 between the rail hooks 63 and the thickened portion 60a, where L6=L4−L5. The distance L6 is determined as L6>L3. When the retainer rod 60 is slid down by the cylindrical coil spring 61 with the bottom lid 66 open, the top end 60b is retracted under the level of the top wall 8a. In response to opening of the bottom lid 66, the driven projection 31 is released from retention. The rotating plate 30 rotates, to rotate the port shutter 14 to the closed position.

Figure 19:
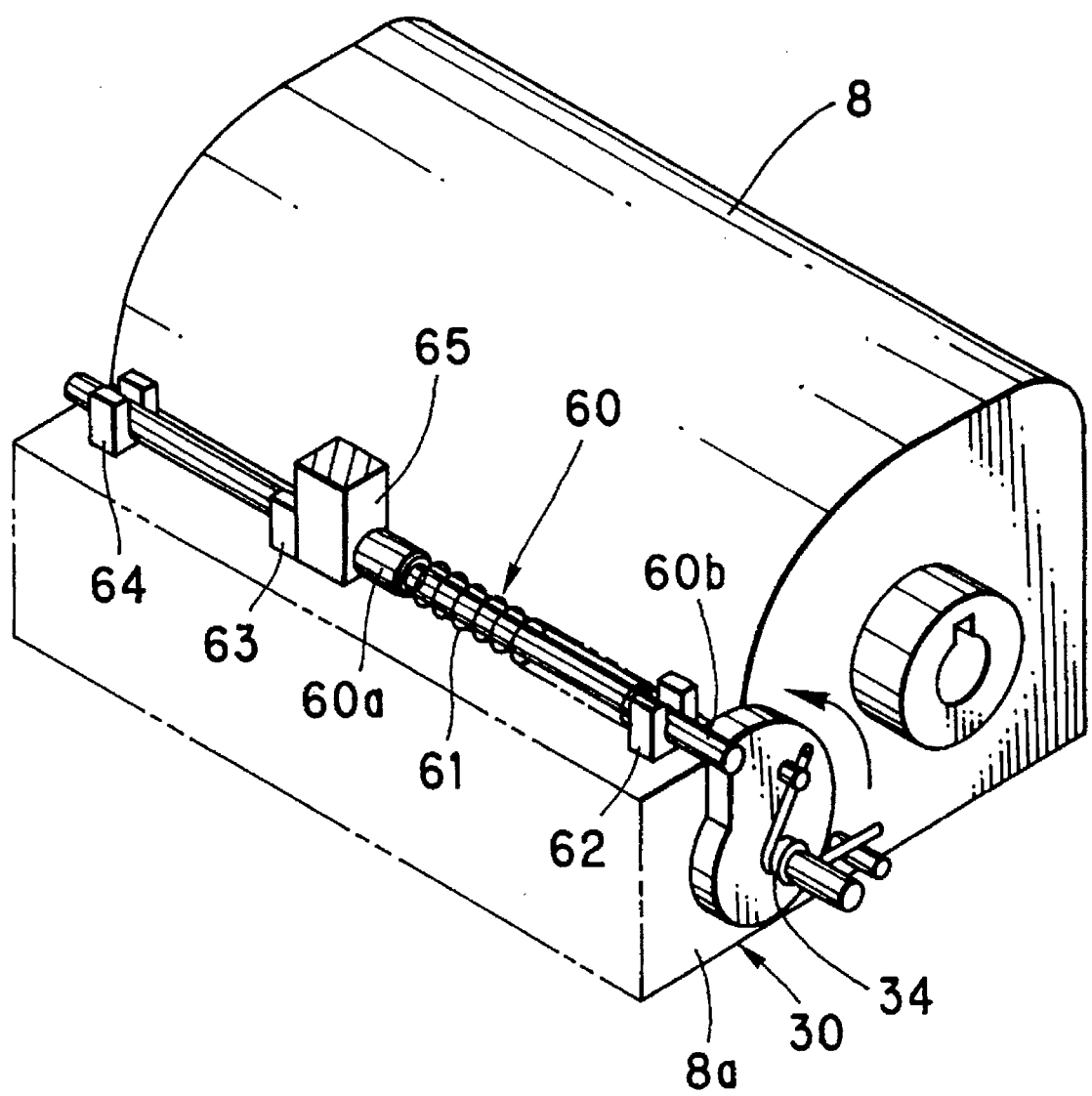
FIG. 19 is a perspective illustrating assemblage of the retainer rod and a spacer with the cassette containing chamber.

Operation of the present embodiment is described now. In assembling the lens-fitted photo film unit, the spacer 65 is inserted between the thickened portion 60a and the rail hooks 63 as illustrated in FIG. 19. The cylindrical coil spring 61 is compressed, while the retainer rod 60 is pressingly inserted between the rail hooks 62, between the rail hooks 63 and between the rail hooks 64. The top end 60b of the retainer rod 60 is kept projected over the top wall 8a during the assemblage.

The rotating plate 30 and the torsion coil spring 34 are mounted next on the cassette containing chamber 8. The top end 60b is projected over the top wall 8a. The rotating plate 30 is mounted in the predetermined angular position like the above embodiments. Then the winding wheel 24 and the exposure-taking unit 40 are mounted on the photo film containing unit 3, which is conveyed into a darkroom station, where the photo film cassette 10 is loaded. Similarly to the above embodiments, the winding wheel 24 and the rotating plate 30 are kept in their angular positions, which do not require adjustment. The key hole 13a in the cassette 11 is easily engaged with the key shaft 24b, at the same time as the key hole 18 is easily engaged with the key shaft 32, before the cassette containing chamber 8 is loaded with the cassette 11.

Figure 20:
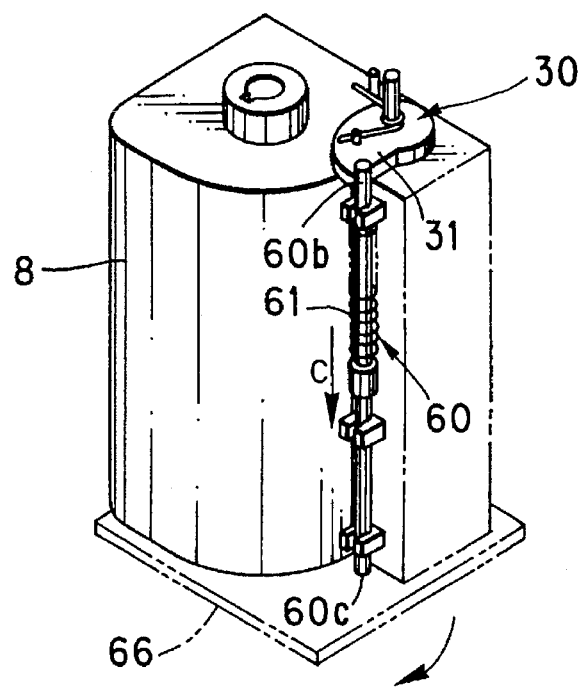
FIG. 20 a perspective illustrating a retained position of the rotating member.

After loading the photo film containing unit 3 with the photo film cassette 10, the rear cover 67 is fitted behind the photo film containing unit 3. The bottom lid 66 is closed, to shield the inside of the photo film containing unit 3 from ambient light. Then the photo film containing unit 3 is conveyed to a station in the illuminated room again. The spacer 65 is pulled away from the photo film containing unit 3. In FIG. 20, the inner face of the bottom lid 66 is contacted on the bottom end 60c of the retainer rod 60. Even without the spacer 65, the bias of the cylindrical coil spring 61 keeps the retainer rod 60 from sliding down in the arrow direction C. The top end 60b retains the rotating plate 30 for the port shutter 14 to have the closed position. Then the front cover 4 is fitted on the front, to complete the housing 2.

Figure 21:
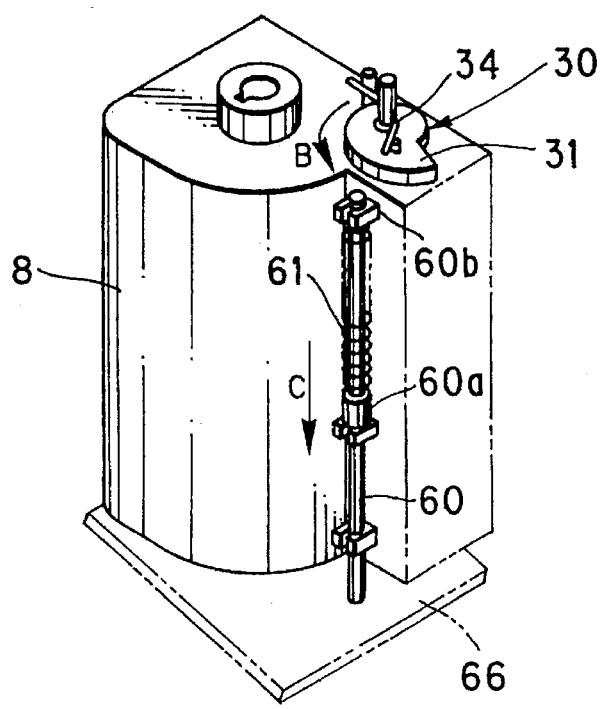
FIG. 21 is a perspective illustrating a released position of the rotating member.

To remove the cassette 11 after exposures, the bottom lid 66 is swung open about the hinge portion 67a by use of a screwdriver or other tools. In correspondence with an open amount of the bottom lid 66, the retainer rod 60 is slid down by the bias of the cylindrical coil spring 61. When the retainer rod 60 slides as much as a length L3, the driven projection 31 is disengaged from the top end 60b as illustrated in FIG. 21. The bias of the torsion coil spring 34 rotates the rotating plate 30 in the arrow direction B, to rotate the port shutter 14 to the closed position. Note that, when the port shutter 14 has come to the closed position, the cassette containing chamber 8 is kept from ambient light by operation of the light-shielding ridge 66a. The bottom lid 66 is completely open, to remove the cassette 11.

In the above embodiment, the bottom lid 66 is swung open. The present invention is applicable to a lens-fitted photo film unit in which a bottom lid is slidable between open and closed positions. It is preferable that, when the slidable bottom lid completely closes the cassette containing chamber 8, the slidable lid is contacted on the bottom end 60c of the retainer rod 60. When the slidable lid is slid to a halfway open position, for example to the rear, a bottom end of the retainer rod can be free from contact on the slidable lid, or received in a cutout formed in the slidable lid. In the above embodiments, the retainer rod 50 is cylindrical, namely circular as viewed in cross section. Alternatively a retainer rod may be shaped to be rectangular as viewed in cross section, or other long forms.

Still another preferred embodiment is described now, in which a retainer lever disposed in swingable fashion retains a rotating member. Elements similar to those of the above embodiments are designated with identical reference numerals.

In FIG. 22, a cassette containing chamber 70 has a rear wall 71. A pin 71a under the rear wall 71 supports a retainer lever 72 in swingable fashion via a hole 72a. The retainer lever 72 is swingable in the arrow direction F about the pin 71a. The retainer lever 72 includes a top end 73 and a bottom end 74. The top end 73 is directed upwards from the pin 71a and over a top face 70a. The bottom end 74 is bent downwards in an L-shape, and is contacted on a bottom lid 75. The retainer lever 72 is so shaped that a rotational radius of the top end 73 is greater than that of the bottom end 74. When the bottom end 74 is moved to a small extent, an end of the top end 73 is swung or moved to the greater extent.

A rotating plate 76 has a driven projection 77, which is projected to the rear, biased in the arrow direction B by a torsion coil spring 78, contacted on the top end 73 and retained thereby. The retainer lever 72 is pressed by the rotating plate 76 associated with the torsion coil spring 78. While the bottom lid 75 is closed, the bottom lid 75 is contacted on the bottom end 74, to hinder the retainer lever 72 from rotating in the arrow direction F. As illustrated in FIG. 22, the rotating plate 76 is retained in a position of keeping the port shutter 14 in the open position against the torsion coil spring 78. When the bottom lid 75 is opened, the bottom end 74 is allowed to move toward the bottom as illustrated in FIG. 23. The rotating plate 76 causes the top end 73 to rotate in the arrow direction F until contact on a regulating pin 71b. The rotating plate 76 is rotated by the bottom lid 75 in the arrow direction B in engagement of the driven projection 77 with the top end 73, to rotate the port shutter 14 to the closed position.

In FIG. 24, the rear of the cassette containing chamber 8 is covered by a rear cover 79 for shielding ambient light from behind the photo film containing unit 3. The rear cover 79 keeps the retainer lever 72 supported without dropping. The rear cover 79 has an opening 79a, through which the bottom end 74 emerges downwards from the cassette containing chamber 70. The bottom lid 75 is swung open in a longitudinal direction of the housing. Before the port shutter 14 is rotated to the closed position, the inside of the cassette containing chamber 70 is protected from ambient light by a light-shielding ridge 75a. The bottom lid 75 has a receiving face 75b on which the bottom end 74 is contacted.

In operation of the above embodiment, the retainer lever 72, at first, is mounted on the rear of the cassette containing chamber 70. The rotating plate 76 and the torsion coil spring 78 are then mounted. The rotating plate 76 as mounted is retained by a specified tool or jig in an angular position associated with an open position of the port shutter 14, and conveyed while retained.

Then the winding wheel 24 and the exposure-taking unit 40 are assembled. The photo film containing unit 3 is conveyed into a darkroom station. The photo film cassette 10 is loaded. The cassette 11 is inserted into the cassette containing chamber 70 upwards. The photo film 12 as drawn is inserted into the photo film containing unit 3 through a bottom slit under a photo film passageway 70b downstream from the cassette containing chamber 70 (See FIG. 22). After loading the photo film containing unit 3 with the photo film cassette 10, the rear cover 79 is fitted behind the photo film containing unit 3, to cover the rear of the photo film containing unit 3 including the retaining lever 72.

After mounting the rear cover 79, the bottom lid 75 is closed to keep the photo film containing unit 3 internally light-tight. The jig supporting the rotating plate 76 is removed. In FIG. 22, the receiving face 75b is contacted on the bottom end 74. The retainer lever 72 does not rotate after removing the jig. The rotating plate 76 is retained by the top end 73, to keep the port shutter 14 in the open position. The front cover 4 is mounted on the front, to complete the housing 2.

To remove the cassette 11 after taking exposures, the bottom lid 75 is opened by use of a screwdriver. When the bottom lid 75 is opened, the bottom end 74 is allowed to move downwards as illustrated in FIG. 23. The retainer lever 72 while pressed by the rotating plate 76 is rotated in the arrow direction F. A position of engaging the driven projection 77 and the top end 73 is moved to the right as viewed in FIG. 23. The rotating plate 76 is rotated by the torsion coil spring 78 in the arrow direction B. Then the port shutter 14 is swung to the closed position. The bottom lid 75 is entirely opened, to remove the cassette 11.

The cassette 11 is removable after the port shutter 14 comes to the closed position in response to opening operation of the bottom lid 75. Note that a slidable bottom lid, not swingable, can be used with the retainer lever 72. It is preferred to construct the slidable bottom lid such that the bottom end 74 is not contacted on the slidable bottom lid when the bottom lid is slid to the front to a small extent.

In the above embodiments, the bottom lid 7 is swung open toward the rear. The bottom lid 66 and the bottom lid 75 are swung open toward the right as viewed from a user, namely laterally away from the center of the housing. The present invention is applicable to a lens-fitted photo film unit of which a bottom lid is swung open toward the front, or toward the center of the housing.

It is preferable that a position of contact between a bottom lid and a retainer rod or lever is as distant from the rotational axis of the bottom lid as possible, in consideration of consistency between stroke of the retainer rod or lever and openness of the bottom lid. The retainer rod or lever should have great stroke in view of unfailing closing of the port shutter, whilst the bottom lid should have small openness in view of light-tightness during closing operation of the port shutter.

Another preferred embodiment is described, in which a retainer rod is rotated about its own axis. Elements similar to those of the above embodiments are designated with identical reference numerals.

Figure 25:
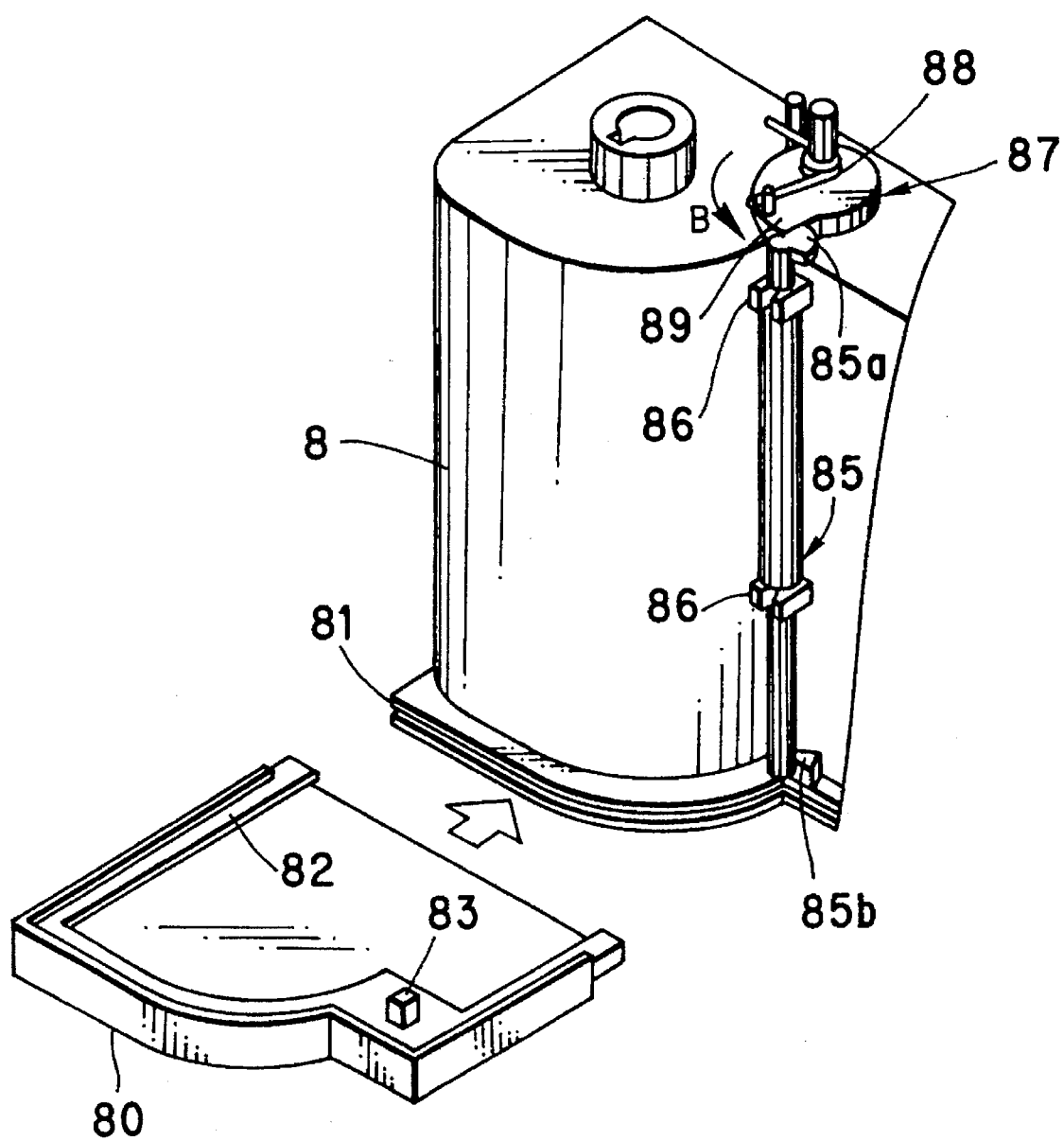
FIG. 25 is an explanatory view in perspective illustrating still another preferred retainer rod together with a slidable bottom lid.
Figure 26:
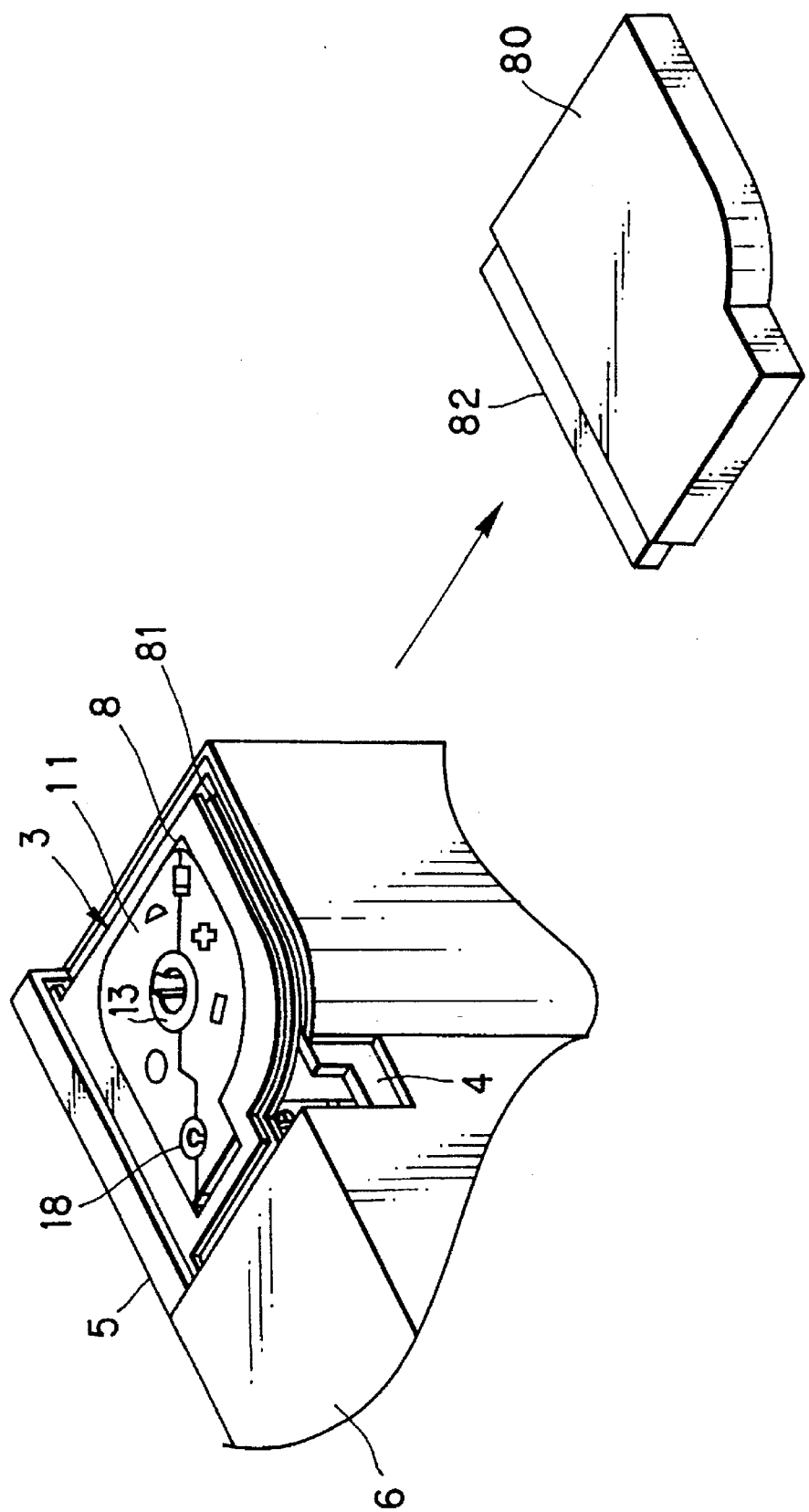
FIG. 26 is an exploded perspective, partially cutaway, illustrating a bottom of a cassette containing chamber.

In FIGS. 25 and 26, a bottom lid 80 is slidable in a back-to-front direction of the cassette containing chamber 8. The periphery of the bottom lid 80 has a light-shielding ridge 82, which is fitted in a groove 81 of the cassette containing chamber 8, to protect the inside of the cassette containing chamber 8 from ambient light. The light-shielding ridge 82 has a sufficient size in the back-to-front direction of the bottom lid 80, for shielding light in cooperation with the groove 81. Before the port shutter 14 is rotated to the closed position in response to the forward slide of the bottom lid 80, the cassette containing chamber 8 is shielded from ambient light. The bottom lid 80 has a lid projection 83 for retaining a bottom projection 85b of a retainer rod 85.

The retainer rod 85 is inserted between rail hooks 86, and supported outside the cassette containing chamber 8 in rotatable fashion. The retainer rod 85 has a thickened portion which has a greater diameter, is located between upper and lower ones of the rail hooks 86, and keeps the retainer rod 85 from sliding up or down. The retainer rod 85 has a top projection 85a for retaining the light-shielding ridge 82 of the groove 81, and the bottom projection 85b engaged with the lid projection 83. Both of the top projection 85a and the bottom projection 85b are projected radially with respect to the retainer rod 85.

Figure 27:
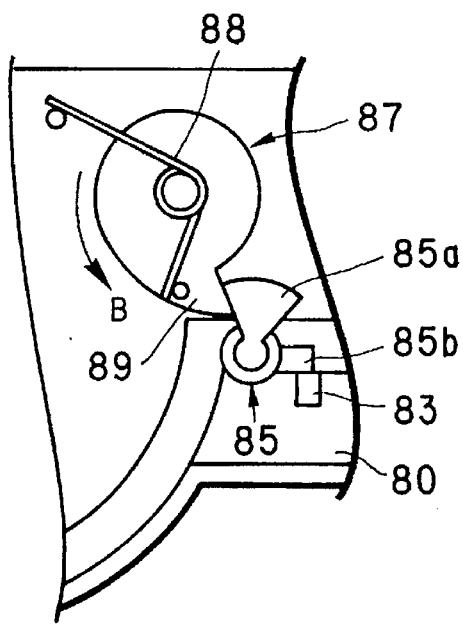
FIG. 27 is a plan, partially cutaway, illustrating a retained position of a rotating plate.

A rotating plate 87 is biased rotationally in the arrow direction B by a torsion coil spring 88, and so mounted as to engage a driven projection 89 with the top projection 85a. The top projection 85a is pressed by the driven projection 89 to the right as viewed in FIG. 25. While the bottom lid 80 completely closes the exit opening of the cassette containing chamber 8, the lid projection 83 retains the bottom projection 85b to stop the bottom lid 80 from rotating as illustrated in FIG. 27. The top projection 85a on the top of the retainer rod 85 retains the driven projection 89, to retain the rotating plate 87 in an angular position associated with the open position of the port shutter 14.

Figure 28:
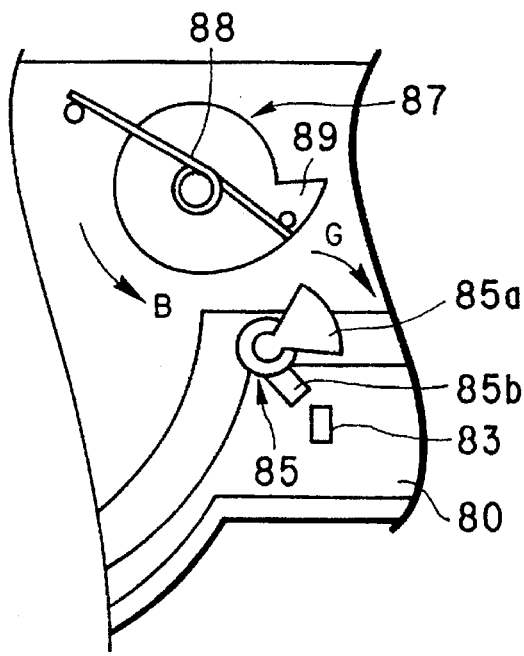
FIG. 28 is a plan, partially cutaway, illustrating a released position of the rotating plate.
Figure 29:
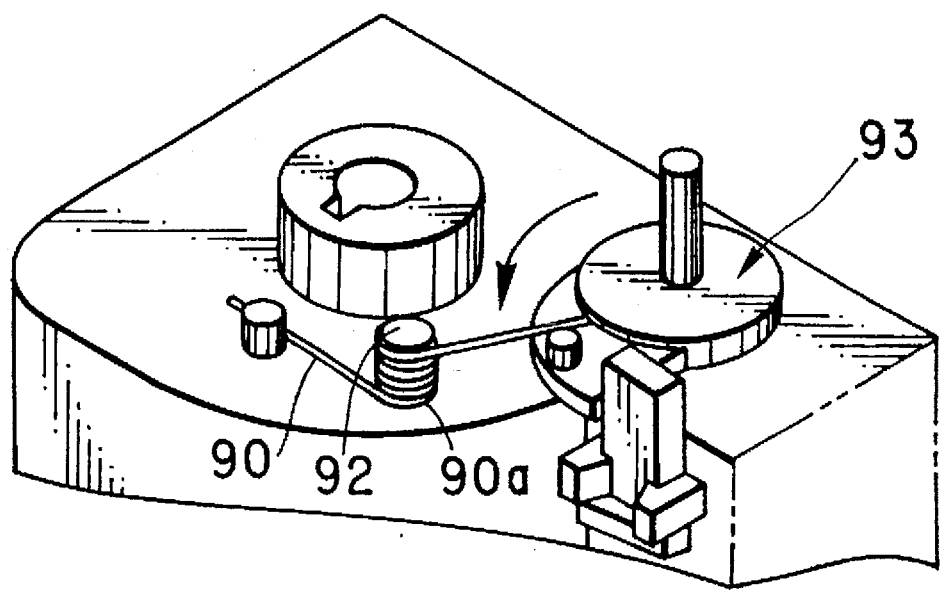
FIG. 29 is a perspective illustrating a variant rotating plate associated with a different torsion coil spring.

When the bottom lid 80 is slid to the front, the bottom projection 85b is released from retention of the lid projection 83 as illustrated in FIG. 28. The top projection 85a is pressed in the arrow direction B by the rotating plate 87 biased by the torsion coil spring 88. The retainer rod 85 rotates in the arrow direction G. The top projection 85a rotates to release the driven projection 89 from retention. The rotating plate 87 is rotated in the arrow direction B, to rotate the port shutter 14 to the closed position. Note that the rail hooks 86 are not shown in FIGS. 27 and 28 for the simplification in convenience.

To remove the cassette 11, the bottom lid 80 is slid to the front. The lid projection 83 is also slid similarly. At the start of the slide of the bottom lid 80, the bottom projection 85b is released from retention of the lid projection 83. The top projection 85a is pressed by the driven projection 89 of the rotating plate 87 and rotated in the arrow direction G. The rotating plate 87 rotates in the arrow direction B. The port shutter 14 is rotated to the closed position. The bottom lid 80 is further slid to the front, to open the exit opening of the cassette containing chamber 8 fully. The cassette 11 is removed.

In the present embodiment, the bottom lid is slidable. However the feature of the present embodiment can be used also with a swingable bottom lid.

In the above embodiments, the torsion coil spring portion receives insertion of the support shaft formed on the rotating plate. Alternatively it is possible that a torsion coil spring portion 90a of a torsion coil spring 90 receives insertion of a support pin 92 projected on the top of the cassette containing chamber. One arm portion of the torsion coil spring 90 can be secured to a rotating plate 93. It is also possible to use a cylindrical coil spring or a plate spring, instead of the torsion coil spring.

In any of the above embodiments, the cassette is removed when the bottom lid is opened. In response to the opening operation of the bottom lid, the port shutter is rotated to the closed position. The present invention is applicable to lens-fitted photo film units having a rear lid or lateral lid for the cassette containing chamber, instead of the bottom lid. Also the present invention is applicable to lens-fitted photo film units in which a bottom wall of the housing or a rear cover is removed for the purpose of removing the cassette.

In any of the above embodiments, prior to removal of the cassette the bottom lid is opened. The present invention is applicable to a lens-fitted photo film unit in which a port shutter is moved to the closed position in response to other operations performed prior to the removal.

Taking an exposure on a final frame can be detected by monitoring a rotational position of the frame counter plate 44. An alternative structure for closing a port shutter can be constructed operable in response to taking the final exposure with the frame counter plate 44 monitored for the rotational position. Another structure for the shutter closing can be constructed by comparing a rotated amount of the winding wheel to an amount sufficient for winding all the photo film into the cassette.

It is possible to dispose a member in a certain suitable position inside a photo film passageway for detecting existence and absence of photo film, to be used instead of the frame counter plate. To close a port shutter, a leader of the photo film is detected for movement past the detecting member. Rotation of the winding wheel is monitored for its sufficient amount such that the photo film is entirely wound into the cassette. With this construction, it is possible to use a lid lock device for locking the bottom lid in the closed position. The lock device may be linked with the port shutter: the port shutter may be closed in response to the unlocking of the bottom lid through the lock device.

Also, the present invention is applicable to a lens-fitted photo film unit in which a port shutter is closed in response to opening operation of a lid lock device, which may be rotatable between a locked position in engagement with the housing to close the bottom lid, and an unlocked position in disengagement from the housing to allow opening the bottom lid.

In the above embodiment, the photo film 12 is drawn from the cassette 11 and wound as a roll by an external spool in a manufacturing factory, to be included in the roll chamber.

The present invention is applicable to a lens-fitted photo film unit incorporating two spools, which include the spool 13 contained in the cassette 11, and another disposed in the roll chamber for winding the photo film 12 before exposures.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, having a photo film roll chamber and a cassette containing chamber, wherein said cassette containing chamber contains a cassette, said roll chamber contains a roll of photo film drawn from said cassette, said cassette incorporates a port shutter rotatable between a closed position of closing a photo film passage port and an open position of opening said passage port, said photo film is wound into said cassette as much as one frame each time one frame is exposed, and said cassette is removed from said cassette containing chamber after winding said photo film entirely into said cassette, said lens-fitted photo film unit comprising:

an exit opening through which said cassette is removed from said cassette containing chamber;

an openable lid disposed to close said exit opening, and opened for said removal of said cassette;

a port shutter rotating mechanism, connected to said port shutter from outside said cassette containing chamber, for rotating said port shutter from said open position to said closed position; and a transmission mechanism for transmitting opening motion of said lid to said port shutter rotating mechanism, to set said port shutter in said closed position.

2. A lens-fitted photo film unit as defined in claim 1, wherein said exit opening is formed in a bottom of said cassette containing chamber, and said port shutter rotating mechanism is disposed on a top wall of said cassette containing chamber.

3. A lens-fitted photo film unit as defined in claim 2, wherein said port shutter rotating mechanism includes:

a rotating member, engaged with said port shutter, and rotatable integrally with said port shutter, said rotating member having a first position when said port shutter has said open position, and a second position when said port shutter has said closed position; and a bias member for biasing said rotating member from said first position to said second position.

4. A lens-fitted photo film unit as defined in claim 3, wherein said transmission mechanism includes a retainer member, extended from said lid toward said rotating member, disposed movably, and when said lid is closed, said retainer member retaining said rotating member in said first position against said bias member, wherein said retainer member is moved in response to said opening motion of said lid, to release said rotating member from retention, and said bias member rotates said port shutter to said second position.

5. A lens-fitted photo film unit as defined in claim 4, wherein said cassette containing chamber includes:

a first sub-chamber for containing a portion of said cassette different from a portion having said photo film passage port; and a second sub-chamber, formed by extending a rear part of said first sub-chamber, for containing said photo film passage port of said cassette, wherein said second sub-chamber is defined between front and rear walls confronted with one another, and said retainer member is disposed in front of said front wall or behind said rear wall.

6. A lens-fitted photo film unit as defined in claim 5, wherein a through hole is formed in said top wall of said cassette containing chamber;

said rotating member includes a key shaft, projected downwards, and supported in said through hole in rotatable fashion; and said cassette includes a key hole, formed in a top end of said port shutter, engaged with said key shaft, and rotated by said rotating member.

7. A lens-fitted photo film unit as defined in claim 6, wherein said port shutter rotating mechanism includes a deformable engaging claw, projected from said key shaft in a radial direction thereof, contacted on a periphery of said through hole, for preventing said key shaft from coming out of said through hole.

8. A lens-fitted photo film unit as defined in claim 4, wherein said retainer member is a retainer rod, slidable between an upper position and a lower position downward from said upper position, slid to said upper position for retaining said rotating member in said first position, and slid to said lower position for releasing said rotating member from said retention in said first position.

9. A lens-fitted photo film unit as defined in claim 8, wherein an engaging portion is disposed on said lid, engaged with a bottom end of said retainer rod, for pulling down said bottom end upon said opening motion of said lid, to slide said retainer rod to said lower position, said rotating member being released from said retention at a top end of said retainer rod.

10. A lens-fitted photo film unit as defined in claim 9, wherein a rod claw is disposed on said bottom end of said retainer rod, and engaged with said engaging portion.

11. A lens-fitted photo film unit as defined in claim 8, further comprising at least one rail member, disposed outside said cassette containing chamber, for supporting said retainer rod in slidable fashion.

12. A lens-fitted photo film unit as defined in claim 10, wherein said at least one rail member includes first and second deformable rail portions, confronted with one another, said retainer rod being inserted between said first and second rail portions.

13. A lens-fitted photo film unit as defined in claim 12, wherein said stopper portion is disposed on said retainer rod and under said at least one rail member, projected crosswise to said retainer rod, and contacted on said at least one rail member, for preventing said retainer rod from sliding up beyond said upper position.

14. A lens-fitted photo film unit as defined in claim 13, further comprising:

a first rail hook, projected from said first rail portion toward said second rail portion; and a second rail hook, projected from said second rail portion toward said first rail hook, said first and second rail hooks allowing inserting said retainer rod between said first and second rail portions, and preventing said retainer rod from coming out of said first and second rail portions.

15. A lens-fitted photo film unit as defined in claim 14, wherein an auxiliary stopper portion is disposed on said retainer rod and over said at least one rail member, projected crosswise to said retainer rod, and contacted on said at least one rail member, for preventing said retainer rod from sliding down beyond said lower position.

16. A lens-fitted photo film unit as defined in claim 15, wherein said auxiliary stopper portion is projected in such inclination that a size increases upwards in a direction crosswise to said retainer rod, keeps said retainer rod in said upper position when said lid is closed, and resiliently spreads said at least one rail member while said retainer rod is slid toward said lower position.

17. A lens-fitted photo film unit as defined in claim 8, wherein a rod bias member biases said retainer rod, to press a bottom end of said retainer rod against said lid, said rod bias member sliding said retainer rod to said lower position in response to said opening motion of said lid, to release said rotating member from said retention at a top end of said retainer rod.

18. A lens-fitted photo film unit as defined in claim 7, wherein when said lid is closed, said bottom end of said retainer rod is pressed by said lid against bias of said rod bias member, and is positioned in said upper position.

19. A lens-fitted photo film unit as defined in claim 5, wherein said retainer member is a retainer lever disposed in fashion swingable about an axis directed crosswise to said port shutter, and swingable in a retaining direction and a releasing direction opposite thereto, said retainer lever including top and bottom ends, and said bottom end being pressed by said lid in said retaining direction;
 further comprising a projection, projected from said rotating member, disposed in an orbit where said top end swings, and pressed by said top end in said retaining direction;
 wherein said bottom end is released from being pressed by said lid in response to said opening motion of said lid, for allowing said retainer lever to swing in said releasing direction, so as to release said projection from said retention at said top end, and responsively said bias device causes said rotating member to rotate said port shutter to said closed position.

20. A lens-fitted photo film unit as defined in claim 5, wherein a lid projection is projected from said lid;
 said retainer member being a retainer rod disposed in fashion rotatable about an axis directed in a longitudinal direction of said port shutter, and rotatable in a retaining direction and a releasing direction opposite thereto, said retainer rod including:
 a bottom projection, disposed substantially at a bottom end thereof, projected in a radial direction thereof, and pressed by said bottom projection in said retaining direction; and
 a top projection, disposed substantially at a top end thereof, and projected in said radial direction;
 further comprising a driven projection, projected from said rotating member, disposed in an orbit where said top projection rotates, and pressed by said top projection in said retaining direction;
 wherein said bottom projection is released from being pressed by said lid in response to said opening motion of said lid, for allowing said retainer lever to rotate in said releasing direction, so as to release said driven projection from said retention at said top projection, and responsively said bias member causes said rotating member to rotate said port shutter to said closed position.

21. A lens-fitted photo film unit as defined in claim 20, further comprising at least one rail member, disposed outside said cassette containing chamber, for supporting said retainer rod in rotatable fashion.

22. A lens-fitted photo film unit as defined in claim 5, further comprising a support pin projected from said top wall of said cassette containing chamber;
 wherein said bias member includes:
 a torsion coil spring portion through which said support pin is inserted;
 a first arm portion, extended from a first end of said torsion coil spring portion, and secured to said top wall of said cassette containing chamber; and
 a second arm portion, extended from a second end of said torsion coil spring portion, secured to said rotating member, for transmitting recovering force of said torsion coil spring portion to said rotating member.

23. A lens-fitted photo film unit as defined in claim 5, further comprising a support shaft projected upwards from said rotating member and at a rotational center thereof;
 wherein said bias member includes:
 a torsion coil spring portion through which said support shaft is inserted;
 a first arm portion, extended from a first end of said torsion coil spring portion, and secured to said top wall of said cassette containing chamber; and
 a second arm portion, extended from a second end of said torsion coil spring portion, secured to said rotating member, for transmitting recovering force of said torsion coil spring portion to said rotating member.

24. A lens-fitted photo film unit as defined in claim 5, further comprising:
 a spool contained in said cassette in rotatable fashion, a trailer of said photo film being secured to said spool;
 a winding wheel, mounted on said top wall of said cassette containing chamber, operated externally, for rotating said spool;
 a reversal preventing claw, disposed on said top wall of said cassette containing chamber, engaged with said winding wheel, for hindering said winding wheel from rotating said spool in reverse to winding of said photo film;
 a cover plate, secured to said top wall of said cassette containing chamber, for covering said rotating member; and
 a regulating pin, disposed on a bottom of said cover plate, for receiving said reversal preventing claw when said reversal preventing claw is deformed in reverse to winding of said photo film, so as to avoid further deformation of said reversal preventing claw, to stabilize hindrance of said winding wheel from said reverse rotation.

25. A lens-fitted photo film unit as defined in claim 5, further comprising:
 a support shaft projected upwards from said rotating member and at a rotational center thereof;
 a cover plate, secured to said top wall of said cassette containing chamber, for covering said rotating member; and
 a receiving hole formed in said cover plate, said support shaft being inserted in said receiving hole, and supported therein.

26. A lens-fitted photo film unit as defined in claim 5, further comprising:
 a spool contained in said cassette in rotatable fashion, a trailer of said photo film being secured to said spool;
 a winding wheel, mounted on said top wall of said cassette containing chamber, operated externally, for rotating said spool; and
 a reversal preventing claw, disposed on said top wall of said cassette containing chamber, engaged with said winding wheel, for hindering said winding wheel from rotating said spool in reverse to winding of said photo film;

wherein said support shaft receives said reversal preventing claw when said reversal preventing claw is deformed in reverse to winding of said photo film, so as to avoid further deformation of said reversal preventing claw, to stabilize hindrance of said winding wheel from said reverse rotation.

27. A lens-fitted photo film unit as defined in claim 25, wherein said receiving hole has a periphery closed to a periphery of said cover plate.

28. A lens-fitted photo film unit as defined in claim 25, wherein said receiving hole has a periphery open to a periphery of said cover plate.

29. A method of producing a lens-fitted photo film unit, said lens-fitted photo film unit having a housing in which a photo film roll chamber and a cassette containing chamber are formed, wherein said cassette containing chamber contains a cassette, said roll chamber contains a roll of photo film drawn from said cassette, said cassette incorporates a port shutter rotatable between a closed position of closing a photo film passage port and an open position of opening said passage port, said photo film is wound into said cassette as much as one frame each time one frame is exposed, and said cassette is removed from said cassette containing chamber after winding said photo film entirely into said cassette, said lens-fitted photo film unit comprising: an exit opening through which said cassette is removed from said cassette containing chamber; an openable lid disposed to close said exit opening, and opened for said removal of said cassette; a rotating member, engaged with said port shutter, and rotatable integrally with said port shutter, said rotating member having a first position when said port shutter has said open position, and a second position when said port shutter has said closed position; a bias member for biasing said rotating member from said first position to said second position; and a retainer member, extended from said lid toward said rotating member, disposed movably, and when said lid is closed, said retainer member retaining said rotating member in said first position against said bias member, wherein said retainer member is moved in response to said opening motion of said lid, to release said rotating member from retention, and said bias member rotates said port shutter to said second position; said producing method comprising steps of:
combining said retainer member with said rotating member, to retain said rotating member in said open position;
mounting said rotating member on said housing with said rotating member retained by said retainer member;
combining said bias member with said rotating member with said rotating member retained by said retainer member, to bias said rotating member against said retainer member, wherein said housing is conveyed with said rotating member, said retainer member and said bias member to where said housing is loaded with photo film and said cassette.

30. A producing method as defined in claim 29, wherein said exit opening is formed in a bottom of said cassette containing chamber, and said rotating member is disposed on a top wall of said cassette containing chamber.

31. A producing method as defined in claim 30, wherein a through hole is formed in said top wall of said cassette containing chamber;
said rotating member includes a key shaft, projected downwards, and supported in said through hole in rotatable fashion; and
said cassette includes a key hole, formed in a top end of said port shutter, engaged with said key shaft, and rotated by said rotating member.

32. A lens-fitted photo film unit as defined in claim 31, wherein said retainer member is a retainer rod, slidable between an upper position and a lower position downward from said upper position, slid to said upper position for retaining said rotating member in said first position, and slid to said lower position for releasing said rotating member from said retention in said first position.

33. A lens-fitted photo film unit, having a photo film roll chamber and a cassette containing chamber, wherein said cassette containing chamber contains a cassette, said roll chamber contains a roll of photo film drawn from said cassette, said cassette incorporates a port shutter rotatable between a closed position of closing a photo film passage port and an open position of opening said passage port, said photo film is wound into said cassette as much as one frame each time one frame is exposed, and said cassette is removed from said cassette containing chamber after winding said photo film entirely into said cassette, said lens-fitted photo film unit comprising:
a rotating member, disposed on a top wall of said cassette containing chamber, engaged with said port shutter, and rotatable integrally with said port shutter, said rotating member having a first position when said port shutter has said open position, and a second position when said port shutter has said closed position;
a bias member for biasing said rotating member from said first position to said second position;
a retainer member, disposed movably toward and away from said rotating member, contacted on said rotating member, for retaining said rotating member in said open position against said bias member; and
a releasing member for moving said retainer member away from said rotating member during a period beginning when said photo film is exposed for a final frame, and ending when at least one portion of said cassette containing chamber is opened for removal of said cassette, wherein said rotating member is released from retention in said open position, and said bias member rotates said port shutter to said closed position.

34. A lens-fitted photo film unit as defined in claim 33, further comprising an openable lid for defining said at least one portion of said cassette containing chamber, said lid being opened for said removal of said cassette, said lid constituting said releasing member, said retainer member being moved away from said rotating member in response to said opening motion of said lid.

35. A lens-fitted photo film unit, having a photo film roll chamber disposed at a left portion thereof and a cassette containing chamber disposed at a right portion thereof, wherein said cassette containing chamber contains a cassette, said roll chamber contains a roll of photo film drawn from said cassette, said cassette incorporates a port shutter rotatable between a closed position in which a photo film passage port is closed and an open position in which said passage port is open, said photo film is wound into said cassette by one frame each time one frame is exposed, and said cassette is removed from said cassette containing chamber after winding said photo film entirely into said cassette, said lens-fitted photo film unit comprising:
an exit opening through which said cassette is removed from said cassette containing chamber, said exit opening being formed at a position corresponding to said cassette containing chamber and in a bottom of said lens-fitted photo film unit;
an openable lid disposed to close said exit opening, and opened for said removal of said cassette;
a port shutter rotating mechanism, connected to said port shutter, for rotating said port shutter from said open position to said closed position, said port shutter rotating mechanism being disposed at a position corresponding to said cassette containing chamber and at an upper portion of said lens-fitted photo film unit, further said port shutter rotating mechanism including a bias member for urging said port shutter to said closed position; and a retainer member for retaining said port shutter rotating mechanism so as to keep said port shutter open, when said retainer member releases said port shutter rotating mechanism, said port shutter rotating mechanism being moved by said bias member, causing said port shutter to be rotated from said open position to said closed position.

36. A lens-fitted photo film unit as defined in claim 35, wherein said retainer member releases said port shutter rotating mechanism in association with said opening of said lid, to set said port shutter in said closed position.

* * * * *